United States Patent
Lipka et al.

(10) Patent No.: US 11,709,690 B2
(45) Date of Patent: Jul. 25, 2023

(54) GENERATING IN-APP GUIDED EDITS INCLUDING CONCISE INSTRUCTIONS AND COACHMARKS

(71) Applicant: Adobe Inc., San Jose, CA (US)

(72) Inventors: Nedim Lipka, Santa Clara, CA (US); Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 33 days.

(21) Appl. No.: 16/812,962

(22) Filed: Mar. 9, 2020

(65) Prior Publication Data

US 2021/0279084 A1    Sep. 9, 2021

(51) Int. Cl.
*G06F 3/0484* (2022.01)
*G06N 3/04* (2023.01)
*G06F 40/279* (2020.01)
*G06F 9/451* (2018.01)

(52) U.S. Cl.
CPC ............ *G06F 9/453* (2018.02); *G06F 3/0484* (2013.01); *G06F 40/279* (2020.01); *G06N 3/04* (2013.01)

(58) Field of Classification Search
CPC ...... G06F 9/453; G06F 3/0484; G06F 40/279; G06N 3/04
See application file for complete search history.

(56) References Cited

U.S. PATENT DOCUMENTS

| | | | |
|---|---|---|---|
| 5,535,422 A | 7/1996 | Chiang et al. | |
| 5,577,186 A | 11/1996 | Man, II et al. | |
| 5,877,757 A | 3/1999 | Baldwin et al. | |
| 9,727,556 B2* | 8/2017 | Wang | G06F 16/345 |
| 2014/0195897 A1* | 7/2014 | Balinsky | G06F 16/345 715/254 |
| 2017/0076471 A1* | 3/2017 | Prophete | G06T 13/80 |
| 2017/0344895 A1* | 11/2017 | Roy | G06F 3/0484 |
| 2019/0324778 A1* | 10/2019 | Bhowmick | H04L 41/5074 |
| 2020/0279017 A1* | 9/2020 | Norton | G06N 3/045 |
| 2020/0387531 A1* | 12/2020 | Agnihotram | G06F 16/3344 |

OTHER PUBLICATIONS

Auther: Yangbin Chen, Yun Ma, Xudong Mao, Qing Li Title: Multi-Task Learning for Abstractive and Extractive Summarization Published online: Apr. 16, 2019 (Year: 2019).*
Chen: ( NPL: Title : Multi-Task Learning for Abstractive and Extractive Summarization, Pub. Date: Feb. 20, 2019) (Year: 2019).*

(Continued)

*Primary Examiner* — Cesar B Paula
*Assistant Examiner* — Zelalem Shalu
(74) *Attorney, Agent, or Firm* — Keller Preece PLLC

(57) ABSTRACT

The present disclosure relates to systems, methods, and non-transitory computer readable media for generating coachmarks and concise instructions based on operation descriptions for performing application operations. For example, the disclosed systems can utilize a multi-task summarization neural network to analyze an operation description and generate a coachmark and a concise instruction corresponding to the operation description. In addition, the disclosed systems can provide a coachmark and a concise instruction for display within a user interface to, directly within a client application, guide a user to perform an operation by interacting with a particular user interface element.

20 Claims, 16 Drawing Sheets

(56) References Cited

OTHER PUBLICATIONS

Li, W., Grossman, T. & Fitzmaurice, G. W. Gamicad: a gamified tutorial system for first time autocad users. In Miller, R., Benko, H. & Latulipe, C. (eds.) UIST, 103-112 (ACM, 2012).
See, A., Liu, P. J. & Manning, C. D. Get to the point: Summarization with pointer-generator networks. CoRR abs/1704.04368 (2017).
Hermann, K. M. et al. Teaching machines to read and comprehend. CoRR abs/1506.03340 (2015).
Narayan, S., Cohen, S. B. & Lapata, M. Don't give me the details, just the summary! topic-aware convolutional neural networks for extreme summarization. CoRR abs/1808.08745 (2018).
Zhu, Y., Groth, O., Bernstein, M. & Fei-Fei, L. Visual7w: Grounded question answering in images. In The IEEE Conference on Computer Vision and Pattern Recognition (CVPR) (2016).
Venugopalan, S. et al. Translating videos to natural language using deep recurrent neural networks. CoRR abs/1412.4729 (2014).
Matuszek, C., Herbst, E., Zettlemoyer, L. & Fox, D. Learning to parse natural language to a robot execution system (2012).
Branavan, S. R. K., Kushman, N., Lei, T. & Barzilay, R. Learning high-level planning from text. In Proceedings of the 50th Annual Meeting of the Association for Computational Linguistics: Long Papers—vol. 1, ACL '12, 126-135 (Association for Computational Linguistics, Stroudsburg, PA, USA, 2012).
Wu, Z. et al. A comprehensive survey on graph neural networks. CoRR abs/1901.00596 (2019).
Lin, C.-Y. Rouge: A package for automatic evaluation of summaries. In Text Summarization Branches Out, 74-81 (Association for Computational Linguistics, Barcelona, Spain, 2004).

\* cited by examiner

| | In-App Instruction System | Baseline1 | Baseline2 |
|---|---|---|---|
| Coachmark Accuracy | .7548 | .7215 | .6822 |
| Rouge-1 | .7215 | N/A | .7012 |
| Rouge-2 | .5248 | N/A | .5019 |

Fig. 12

GENERATING IN-APP GUIDED EDITS INCLUDING CONCISE INSTRUCTIONS AND COACHMARKS

BACKGROUND

In the field of digital application tutorials, online software manuals have been a major source for troubleshooting software problems or performing complex tasks. Systems have developed that can provide manuals or tutorials to guide a user through performing various operations associated with complex tasks or finding a resolution to a software problem. For example, some of these conventional systems can provide lengthy text descriptions of each step involved along with supplementary images, videos, and/or game-like interactions.

Despite these advances however, conventional digital tutorial systems continue to suffer from a number of disadvantages in accuracy, efficiency, and flexibility. For example, many conventional digital tutorial systems cannot accurately generate instructions to guide users through individual steps of a tutorial. Indeed, many of these conventional systems provide inadequate context for a given instruction and rely on users to map instructions from a tutorial to a particular portion of an application or user interface to apply the instructions correctly. Thus, users often execute incorrect operations within an application due to the lack of context which can lead to ambiguity and misinterpretation.

In addition to their potential inaccuracy, many conventional digital tutorial systems are also inefficient. For example, many of these conventional systems require extensive amounts of computer resources such as memory, processing power, and computing time to process excessive user inputs. In particular, due to the separation of the workspace and the learning space in many conventional systems, these systems require users to constantly switch between different applications (e.g., a workspace application and a learning space application) to both learn from a tutorial and execute the operations within the application. If a procedure happens to be long, the frequent context switching of these conventional systems significantly hampers efficiency by requiring so many inputs to alternate between interfaces and applications. This problem is even more severe for mobile devices where screen size makes displaying multiple applications at once more difficult and requires even more user interactions to navigate through the information and operations in a smaller space.

Beyond being inaccurate and inefficient, many conventional digital tutorial systems are also inflexible. More specifically, conventional systems often rigidly utilize a particular set of fixed manuals or tutorials. Indeed, because the tutorials of conventional systems do not account for any particular context of an application, platform, and/or device, these systems utilize the same tutorials in a one-size-fits-all fashion. To provide instructions to guide different users through a particular operation within a photo editing program, for instance, a conventional digital tutorial system provides the same list of tutorial descriptions to each of the users, regardless of the users' individual devices.

Thus, there are several disadvantages with regard to conventional digital tutorial systems.

SUMMARY

One or more embodiments described herein provide benefits and solve one or more of the foregoing or other problems in the art with systems, methods, and non-transitory computer readable media that can provide in-app guided tutorials by generating concise instructions for display in relation to particular user interface elements. In particular, the disclosed systems can utilize a multi-task machine learning model to generate a novel format of a tutorial instruction called an in-app guided edit, which consists of a concise instruction and a coachmark. For example, the disclosed systems can generate a coachmark to indicate a relevant context for a particular instruction (e.g., by highlighting a user interface element within an application currently being used/displayed). The disclosed systems can also utilize the multi-task machine learning model to generate a concise instruction (e.g., from a longer conventional text description) for an operation to place within the user interface in relation to the corresponding coachmark. Thus, by generating shortened versions of instructions and by providing context for the instructions directly within an application, the disclosed systems can more efficiently and effectively guide users through operations.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 12 illustrates a table of performance metrics associated with the in-app instruction system in accordance with one or more embodiments;

DETAILED DESCRIPTION

Figure 1:
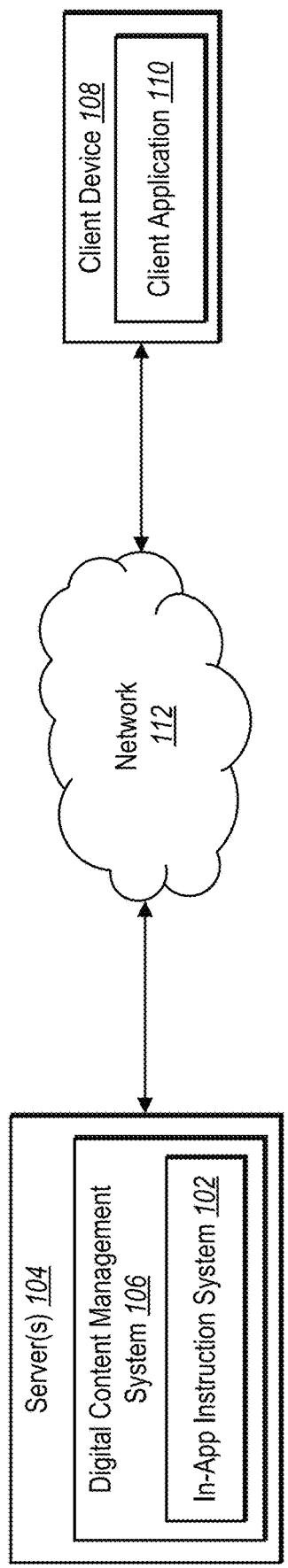
FIG. 1 illustrates an example system environment for implementing an in-app instruction system in accordance with one or more embodiments.

One or more embodiments described herein include an in-app instruction system that can generate concise in-app instructions for presentation together with visual user interface indicators (e.g., coachmarks). In particular, the in-app instruction system can utilize a multi-task machine learning model to analyze text-based descriptions of operations associated with an application (e.g., an existing tutorial) to generate concise instructions (e.g., shortened summaries of the text-based descriptions) and coachmarks. In some embodiments, the in-app instruction system can generate pairs of concise instructions and coachmarks together in the form of in-app guided edits. The in-app instruction system can further provide and/or present the in-app guided edits within a user interface associated with an application for which a client device indicates a request for a tutorial.

To generate the in-app guided edits, the in-app instruction system can generate coachmarks. In particular, the in-app instruction system can analyze a tutorial that includes text descriptions of various operations or steps involved in performing a given task within an application. Based on the analysis, the in-app instruction system can generate a coachmark for a particular text description of a step or operation. For instance, the in-app instruction system can utilize language grounding techniques to associate words of the text description to other objects and/or actions. Specifically, the in-app instruction system can associate the text of a given operation to actual software components required to execute the operation (e.g., user interface menus, dialogues, or buttons). In some embodiments, the in-app instruction system utilizes a multi-task summarization neural network to determine a coachmark identifier (e.g., identify from a repository of coachmark identifiers) corresponding to a text description of the operation.

In one or more embodiments, the in-app instruction system generates coachmarks independently of one another. That is, for an application task with multiple operations (each having its own text description within a tutorial), the in-app instruction system generates different coachmarks for different text descriptions in a vacuum, irrespective of the coachmarks generated for other steps. In other embodiments, however, the in-app instruction system generates coachmarks based on an assumption that coachmarks relating to different operations of a single task are related to one another. For example, the in-app instruction system can generate coachmarks or infer coachmarks jointly, where the generation of one coachmark influences the generation of a subsequent coachmark (e.g., a coachmark for a subsequent operation).

In addition to coachmarks, the in-app instruction system can generate concise instructions. More specifically, the in-app instruction system can utilize the multi-task summarization neural network to analyze the text of an operation description from a tutorial to generate a shortened or summarized version of the description. For example, the in-app instruction system can utilize the multi-task summarization neural network to summarize a text description by determining which words to select from the description and/or by determining different vocabulary words (not in the description) to use within the concise instruction. The in-app instruction system can likewise generate concise instructions for other text descriptions associated with their own respective operations involved in performing a particular task in an application as well. In one or more embodiments, the in-app instruction system generates the concise instructions based on coachmarks so that the concise instructions include wording that, for example, indicates interactions for a user to perform in relation to the coachmarks.

As mentioned, the in-app instruction system can utilize the multi-task summarization neural network to generate concise instructions and coachmarks. The in-app instruction system can further present (or provide for presentation) the coachmarks and the concise instructions together within a single user interface associated with a particular application. More specifically, the in-app instruction system can provide a coachmark and a corresponding concise instruction for display within an application that a client device is currently operating or executing (and/or for which a client device requests a tutorial). In some embodiments, the in-app instruction system places (or causes to be placed) the coachmark on a particular user interface element and further places (or causes to be placed) the concise instruction relative to the coachmark. In these or other embodiments, the in-app instruction system sizes and/or places coachmarks and concise instructions based on dimensions of a client device and/or layout of a user interface. Additional detail regarding coachmarks and concise instructions is provided hereafter with reference to the figures.

The in-app instruction system can provide several advantages over conventional digital tutorial systems. For example, the in-app instruction system is more accurate than conventional systems. In particular, as opposed to conventional systems that rely on users to map instructions to user interface elements, the in-app instruction system generates concise instructions and coachmarks and provides them directly within an application for context to guide a user to interact with the correct user interface elements. As a result, the in-app instruction system can more accurately guide users to execute operations within applications based on providing sufficient context for the operations.

In addition, the in-app instruction system is more efficient than some conventional digital tutorial systems. For example, the in-app instruction system utilizes fewer computer resources such as memory, computing time, and processing power when it comes to processing user inputs and/or device interactions. To elaborate, the in-app instruction system improves over conventional systems that require users to repeatedly navigate between workspace applications and learning space applications, especially in circumstances where procedures are long (e.g., include multiple operations) and/or where a user is using a mobile device with limited screen space. Indeed, because the in-app instruction system generates in-app coachmarks and in-app instructions for display directly within a currently utilized application, the in-app instruction system reduces the number of user interactions required by conventional systems. The in-app instruction system thus improves efficiency by cutting down on computing requirements necessary to process the user interactions to access desired information and/or functionality.

On top of improved accuracy and efficiency, the in-app instruction system is also more flexible than conventional digital tutorial systems. More specifically, unlike conventional systems that utilize fixed manuals or tutorials irrespective of client devices, the in-app instruction system can flexibly adapt to provide coachmarks and concise instructions at locations specific to client devices. Indeed, for the same operation, the in-app instruction system can provide a first coachmark for display on a mobile device and a different coachmark for display on a desktop device. Additionally, rather than displaying the same verbose text descriptions of operations in a tutorial (like many conventional systems), the in-app instruction system can generate concise instructions that are shorter and that specifically indicate actions for a user to perform with respect to particular coachmarks. Thus, in generating coachmarks and concise instructions, the in-app instruction system can flexibly adapt to individual client devices, particularly when it comes to screen size.

As illustrated by the foregoing discussion, the present disclosure utilizes a variety of terms to describe features and benefits of the in-app instruction system. Additional detail is hereafter provided regarding the meaning of these terms as used in this disclosure. In particular, the term "operation" refers to an action or a function that a client device or a user operating a client device can perform within an application. In particular, an operation can include a step within a tutorial for performing a particular task associated with a client application. Indeed, in some embodiments, an operation is a subcomponent of a task or a procedure that includes multiple constituent operations. As part of a tutorial to guide a user to make a particular edit to a digital image, for instance, example operations can include selecting a particular edit option, entering a value within a dialogue box, and clicking a button to apply the change.

A given operation can have a description associated with the operation. As used herein, the term "operation description" (or sometimes simply "description") refers to a text-based explanation of directions or instructions to guide a user through one or more actions to perform an operation. An operation description can include text explaining actions corresponding to various user interface elements with which a user is to interact to perform an operation.

As mentioned, the in-app instruction system can utilize a multi-task summarization neural network to generate an in-app guided edit that includes both a coachmark and a concise instruction for an operation based on an operation description. As used herein, the term "multi-task summarization neural network" refers to a neural network that analyzes text such as an operation description to generate a coachmark and a concise instruction. Indeed, a multi-task summarization neural network can summarize an operation description to generate a shortened version of a description for performing an operation. A multi-task summarization neural network can also generate a coachmark based on an operation description, where the coachmark indicates a user interface element corresponding to the operation. A multi-task summarization neural network can include multiple constituent components, each component including one or more layers that have neurons for analyzing data to generate outputs to pass to successive layers. For example, a multi-task summarization neural network can include an encoder, a decoder, a coachmark generator, and a concise instruction generator.

Relatedly, the term "coachmark" refers to a visual indicator for indicating a user interface element based on an operation description. In particular, a coachmark can include a visual representation, a depiction, or a portrayal of a marker or some other indicator to point out a user interface element that corresponds to an operation. For example, a coachmark can include a colored box outlining a user interface element, a highlight of a user interface element, an arrow, a dot, a flashing icon, or some other visual effect to draw a user's attention. In some embodiments, a coachmark indicates a user interface element with which a user is to interact to perform an operation as part of a tutorial. A tutorial for a single task with multiple operations can thus correspond to multiple coachmarks that highlight successive user interface elements throughout the progression of the tutorial.

In one or more embodiments, a coachmark corresponds to a coachmark identifier. As used herein, the term "coachmark identifier" refers to a string of characters that indicates or refers to a particular coachmark. A coachmark identifier can have a particular format (e.g., "Bitmap_Dialog #Output" within a JSON file) where certain characters such as "_" and "+" are used as delimiters to separate different parts of the indicator. For example, a coachmark identifier can indicate a particular user interface element (e.g., "Output") to highlight within a particular menu or portion of a user interface of an application (e.g., "Bitmap_Dialog"). Each user interface element within a client application can have a corresponding coachmark identifier that represents a coachmark for indicating the user interface element. The in-app instruction system generates a coachmark for an operation description by identifying a coachmark identifier from among a plurality of possible coachmark identifiers. For instance, the in-app instruction system utilizes the multi-task summarization neural network to determine probabilities of coachmark identifiers matching or corresponding to an operation description and selects a coachmark identifier based on the probabilities.

Additionally, the term "concise instruction" refers to a shortened or summarized version of an operation description. Indeed, the in-app instruction system utilizes a multi-task summarization neural network to generate a concise instruction from an operation description. A concise instruction can include particular words selected from an operation description and/or words not from an operation description but instead selected from a vocabulary associated with the multi-task summarization neural network. In some embodiments, a concise instruction can include a particular number of words (e.g., as set by a word count or a token count associated with time steps of the multi-task summarization neural network). For example, a concise instruction can include a number of words based on user interface dimensions and/or a screen size of a client device. Thus, a concise instruction includes a summary of an operation description sized to fit directly within an application based on a client device operating a client application for which the corresponding tutorial provides instructions.

In some embodiments, the in-app instruction system can train a multi-task summarization neural network to generate concise instructions and coachmarks. As used herein, the term "train" (or its variations such as "trained" or "training") refers to utilizing information to tune or teach a neural network (e.g., the multi-task summarization neural network) by, for example, testing inputs and adjusting one or more weights or parameters of the neural network to modify (e.g., improve) generated outputs.

Additional detail regarding the in-app instruction system will now be provided with reference to the figures. For example, FIG. 1 illustrates a schematic diagram of an example system environment for implementing an in-app instruction system 102 in accordance with one or more embodiments. An overview of the in-app instruction system 102 is described in relation to FIG. 1. Thereafter, a more detailed description of the components and processes of the in-app instruction system 102 is provided in relation to the subsequent figures.

As shown, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 16.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 16. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to, for example, request a tutorial to perform a particular task or operation within the client application 110. Thus, the in-app instruction system 102 on the server(s) 104 can receive information or instructions to generate a concise instruction and a coachmark based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a user interface for viewing photos or other information, performing certain functionality, and/or providing options to request a tutorial. Additionally, the client application 110 can present information in the form of a coachmark and a concise instruction. A user can interact with the client application 110 to provide user input in the form of interacting with a user interface element to perform an operation and/or requesting a tutorial for performing the operation.

As illustrated in FIG. 1, the environment includes the server(s) 104. The server(s) 104 may generate, track, store, process, receive, and transmit electronic data, such as queries and query results. For example, the server(s) 104 may receive data from the client device 108 in the form of a tutorial request. In addition, the server(s) 104 can transmit data to the client device 108 to provide an in-app guided edit that includes a coachmark and a concise instruction. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the in-app instruction system 102 as part of a digital content management system 106. The digital content management system 106 can communicate with the client device 108 to perform various functions associated with the client application 110 such as identifying digital content items, performing edits, and providing an in-app guided edit. In addition, the digital content management system 106 and/or the in-app instruction system 102 can analyze a repository of operation descriptions (e.g., stored within a database) to generate corresponding in-app guided edits including coachmarks and concise instructions. Further, the digital content management system 106 and/or the in-app instruction system 102 can train one or more multi-task summarization neural networks to generate accurate coachmarks and concise instructions.

Although FIG. 1 depicts the in-app instruction system 102 located on the server(s) 104, in some embodiments, the in-app instruction system 102 may be implemented by (e.g., located entirely or in part) on one or more other components of the environment. For example, the in-app instruction system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the in-app instruction system 102, bypassing the network 112. In addition, the environment can include a database located external to the server(s) 104 (e.g., in communication via the network 112) or located on the server(s) 104 and/or on the client device 108. Additionally, the environment can include one or multi-task summarization neural networks as part of the in-app instruction system 102, stored within a database, included as part of the client application 110, or housed on the server(s) 104.

Figure 2:
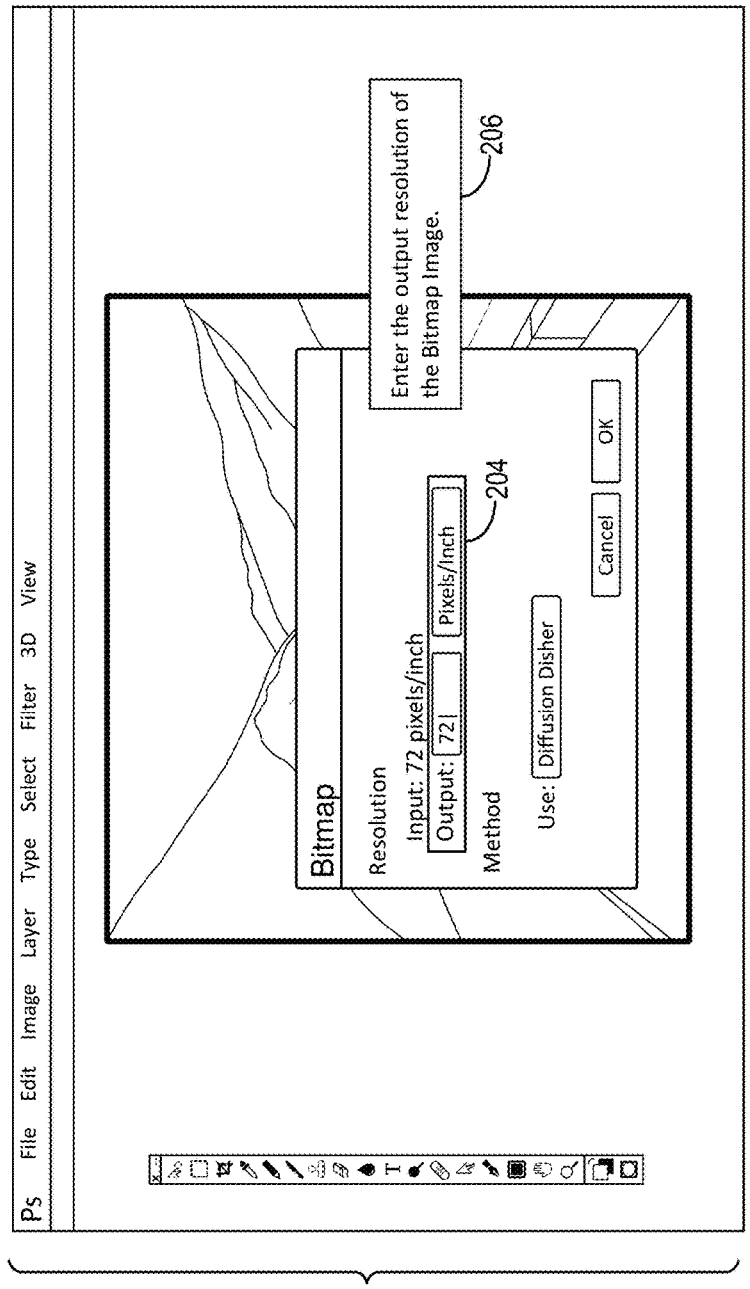
FIG. 2 illustrates a schematic diagram of a process of generating a coachmark and a concise instruction from an operation description in accordance with one or more embodiments.

As mentioned, the in-app instruction system 102 can analyze an operation description to generate an in-app guided edit that includes a coachmark and a concise instruction. In particular, the in-app instruction system 102 can utilize a multi-task summarization neural network to generate a coachmark and a concise instruction based on an operation description. FIG. 2 illustrates a portion of a tutorial for guiding a user through a particular task within a client application (e.g., the client application 110) in accordance with one or more embodiments. As shown in FIG. 2, the tutorial includes three operations (numbered "1", "2," and "3"), and the in-app instruction system 102 analyzes the second operation ("2") to generate an in-app guided edit corresponding to the second operation.

As illustrated in FIG. 2, the in-app instruction system 102 analyzes an operation description 202 for the second operation within the tutorial titled "Convert an image to Bitmap mode." In particular, the in-app instruction system 102 applies a multi-task summarization neural network to analyze the operation description 202 and to generate a coachmark 204 and a concise instruction 206 based on the operation description 202. Indeed, the in-app instruction system 102 generates the coachmark 204 to indicate a user interface element within the user interface 200 that a user utilizing the client device 108 is to interact with as part of performing the operation for the operation description 202. The in-app instruction system 102 further generates the concise instruction 206 as a shortened or summarized version of the operation description 202 to fit within the user interface 200 and to concisely guide a user to perform the associated operation.

To elaborate, the in-app instruction system 102 utilizes a multi-task summarization neural network to select words from the operation description 202 to include within the concise instruction 206. In addition (or alternatively), the in-app instruction system 102 utilizes the multi-task summarization neural network to identify words from a vocabulary (but not within the operation description 202) to include within the concise instruction 206. In some embodiments, the in-app instruction system 102 repeats the process of selecting words from the operation description 202 and/or selecting new vocabulary words for a number of iterations (or time steps) until a threshold number of iterations (or time steps) is met (or a threshold number of words are added to the concise instruction 206).

In the same or other embodiments, the in-app instruction system 102 generates the concise instruction 206 to include particular words that correspond to or indicate the coachmark 204 (or the user interface element indicated by the coachmark 204). For example, as shown in FIG. 2, the coachmark 204 indicates particular input field(s) within the user interface 200. Based on these input fields, the in-app instruction system 102 generates the concise instruction 206 to instruct the user to "Enter the output resolution . . . " because the highlighted input fields require a user to "enter" a value. For other user interface elements, the in-app instruction system 102 can generate a concise instruction to include different words such as "select" (for a drop-down menu), "click" (for a button), or "hover" (for a hover-over element) based on the types of user interface elements indicated by coachmarks.

Figure 3:
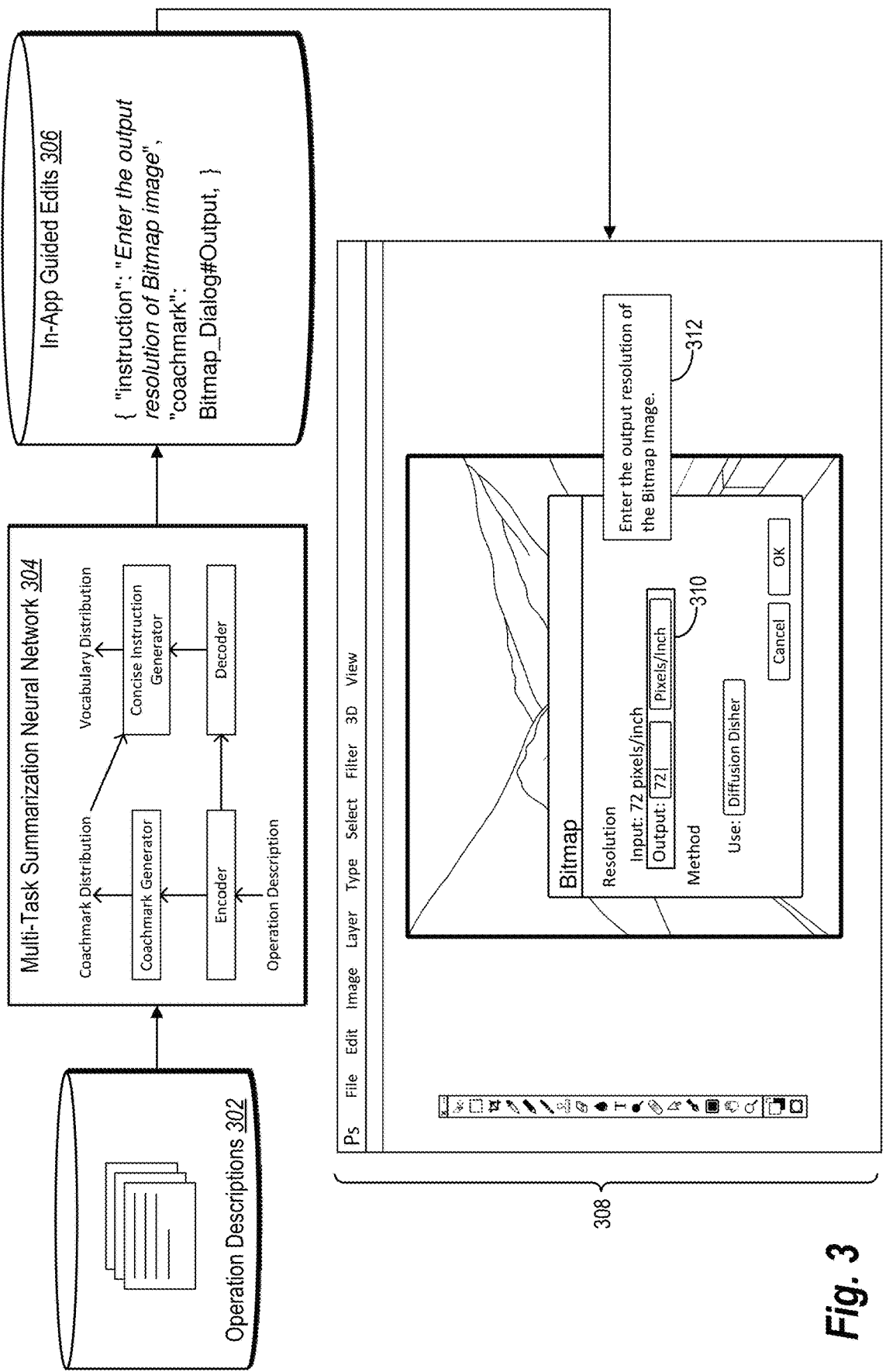
FIG. 3 illustrates a schematic diagram of a process of generating in-app guided edits from operation descriptions utilizing a multi-task summarization neural network in accordance with one or more embodiments.

As mentioned above, the in-app instruction system 102 can generate in-app guided edits for a repository or operation descriptions. In particular, the in-app instruction system 102 can analyze a repository of tutorials for performing different tasks within different application, where each tutorial includes one or more operation descriptions. FIG. 3 illustrates utilizing a multi-task summarization neural network 304 to analyze a repository of operation descriptions 302 and to generate a repository of in-app guided edits 306 from the operation descriptions 302 in accordance with one or more embodiments.

As shown in FIG. 3, the in-app instruction system 102 utilizes the multi-task summarization neural network 304 to generate the in-app guided edits 306 from the operation descriptions 302. In particular, the in-app instruction system 102 generates a repository of in-app guided edits 306 for providing to the client device 108 in response to a request for a tutorial. As shown, the in-app instruction system 102 generates the in-app guided edits 306 to each include a concise instruction and a coachmark. Thus, from the text-based operation descriptions 302, the in-app instruction system 102 generates the in-app guided edits 306 to provide within a user interface such as the user interface 308.

In one or more embodiments, the in-app instruction system 102 generates the in-app guided edits 306 by utilizing a particular protocol and/or file structure. For example, as shown in FIG. 3, the in-app instruction system 102 generates JSON files for the in-app guided edits 306. As shown, the in-app instruction system 102 generates a JSON file for an in-app guided edit that indicates a concise instruction ("Enter the output resolution of Bitmap image") and a corresponding coachmark ("Bitmap_Dialog #Output") that defines a user interface element to highlight within a particular menu of an application (e.g., the Output element within the Bitmap Dialog menu). In some embodiments, the in-app instruction system 102 generates a JSON file to include more information such as pixel coordinate locations to place a corner of the concise instruction (e.g., relative to the coachmark) and/or dimensions of the coachmark and/or the concise instruction.

Indeed, as shown in FIG. 3, the in-app instruction system 102 provides a coachmark 310 and a corresponding concise instruction 312 for display within the user interface 308. For example, the in-app instruction system 102 provides the coachmark 310 and the concise instruction for display within the user interface 308 displayed on the client device 108. In some embodiments, the in-app instruction system 102 provides instructions to place the concise instruction 312 in a location relative to the coachmark 310 for readability and/or to accommodate user interface dimensions and/or screen dimensions associated with the client device 108. Thus, by generating the repository of in-app guided edits 306 (e.g., before the client device 108 requests a tutorial), the in-app instruction system 102 can provide coachmarks and concise instructions to the client device 108 on demand in an interactive fashion.

Figure 4:
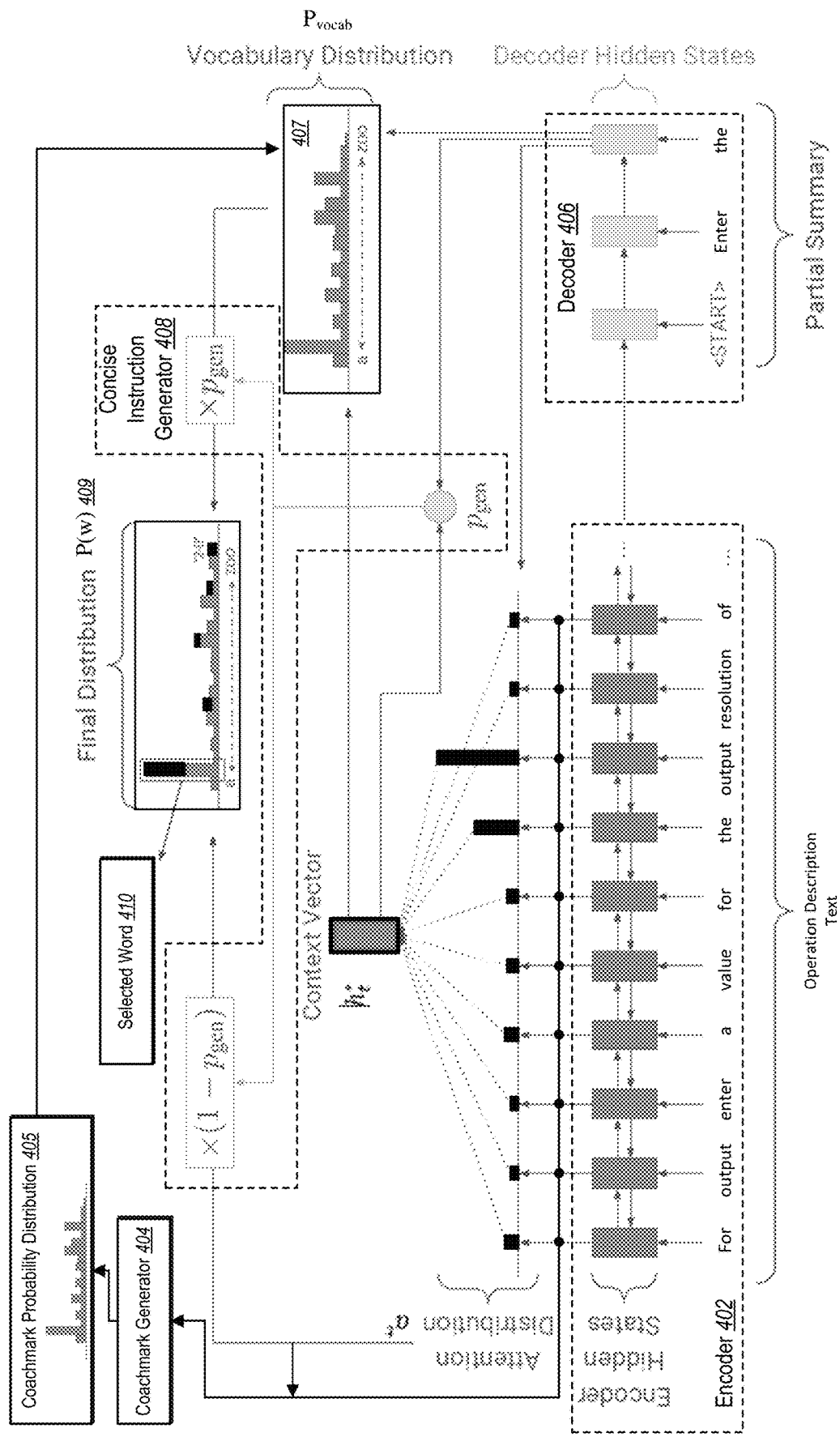
FIG. 4 illustrates an architecture of a multi-task summarization neural network in accordance with one or more embodiments.

As mentioned, the in-app instruction system 102 can utilize a multi-task summarization neural network (e.g., the multi-task summarization neural network 304) to generate coachmarks and concise instructions based on operation descriptions. FIG. 4 illustrates an architecture of a multi-task summarization neural network (e.g., the multi-task summarization neural network 304) including various layers and components in accordance with one or more embodiments. As shown, the multi-task summarization neural network 304 includes an encoder 402, a coachmark generator 404, a decoder 406, and a concise instruction generator 408.

As illustrated in FIG. 4, the in-app instruction system 102 utilizes the encoder 402 to analyze operation description text. In particular, the in-app instruction system 102 applies the encoder 402 to generate encodings for the words of the operation description. For example, the in-app instruction system 102 generates embedding vectors for the words to then input the embedding vectors into the encoder 402 to generate the encodings. For instance, the in-app instruction system 102 utilizes a particular model such as Word2Vec or GloVe to generate embedding vectors for words of an operation description.

Suppose that $x=(x_1, x_2, \ldots, x_n)$ is a sequence of embedding vectors of the tokens (e.g., words) of an input operation description. The in-app instruction system 102 inputs the embedding vectors into the encoder 402 to generate encodings for the operation description. In some embodiments, the encoder 402 is a bi-directional long short-term memory ("biLSTM") encoder and generates encodings for the embedding vectors in accordance with:

$$h_i = \text{biLSTM}(x_i) \text{ for } i=1 \ldots n$$

where $h_i$ represents the encoder hidden states or the encodings for the embedding vectors.

Based on the encodings generated by the encoder 402, the in-app instruction system 102 can apply a coachmark generator 404 to generate a coachmark probability distribution 405. More specifically, the in-app instruction system 102 applies a self-attention to select particular (e.g., important, meaningful, or impactful) words. In some embodiments, the self-attention mechanism is modelled as a multi-layer perceptron ("MLP") with one hidden layer and two parameter matrices. For example, the in-app instruction system 102 applies the coachmark generator 404 to generate the coachmark probability distribution 405 in accordance with:

$$r_i = \tan h(W_s h_i) \text{ for } i=1 \ldots n$$

where $W_s$ is a scan matrix that scans through the list of hidden representations $h_i$ to produce a list of importance representation vectors $r_i$.

In addition, the in-app instruction system 102 pushes the importance representation vectors through an attention weight matrix $W_a$ and normalizes the result using a SoftMax to generate self-attention vectors. For instance, the in-app instruction system 102 generates the self-attention vectors in accordance with:

$$a_i = \text{softmax}(W_a r_i) \text{ for } i=1 \ldots n$$

where $a_i$ represents the self-attention vectors.

Further, the in-app instruction system 102 combines the self-attention vectors $a_i$ with the encoder hidden state vectors $h_i$ and pushes the resulting vector into a feed-forward network ("FFN"). For instance, the in-app instruction system 102 generates the coachmark probability distribution 405 utilizing the coachmark generator 404 based on the combination of the self-attention vectors and the encoder hidden state vectors, as given by:

$$f_X = \sum_{i \in [1 \ldots n]} a_i h_i$$
$$c = \text{softmax}(FFN(f_X))$$

where c is a the coachmark probability distribution 405 indicating probabilities of various coachmark identifiers matching the operation description. Thus, the selection of the coachmarks can be based on the description of the operation with increased weight given to important words learned during training as identified by the self-attention vectors. For example, the in-app instruction system 102 can learn that "lasso" is an important word as the term corresponds to a tool selectable by the software program. Thus, the in-app instruction system 102 can give more weight to the term lasso when identifying a coachmark. Thus, the in-app instruction system 102 can generate coachmarks based on operation descriptions. In particular, the in-app instruction system 102 can utilize language grounding techniques to identify a coachmark identifier that corresponds to the text of an operation description. To identify the coachmark identifier, the in-app instruction system 102 can determine a particular user interface element that corresponds to the operation description which the in-app instruction system 102 is to highlight or otherwise indicate with a coachmark.

In one or more implementations, the in-app instruction system 102 selects the coachmark that has the probability from the coachmark probability distribution 405. Alternatively, as explained below, the in-app instruction system 102 uses an inference technique to jointly select the coachmark.

To generate the concise instruction, the in-app instruction system 102 further utilizes the decoder 406 to generate decoder hidden state vectors at various iterations or time stamps of utilizing the multi-task summarization neural network. For example, the decoder 406 can be a biLSTM that the in-app instruction system 102 utilizes to decode the encodings generated by the encoder 402. In some embodiments, however, the decoder 406 can be a single-layer unidirectional LSTM. The in-app instruction system 102 can input the final hidden state of the encoder 402 as the initial hidden state of the decoder 406. In one or more embodiments, the in-app instruction system 102 generates decoder hidden vectors in accordance with:

$$s_t = \text{biLSTM}(y_t) \text{ for } t=1 \ldots m$$

where $s_t$ represents a hidden vector (or a decoder state) at the time step t and where $y_t$ is the previously generated word.

As illustrated, the in-app instruction system 102 further utilizes the concise instruction generator 408 to select words to use within a concise instruction corresponding to the input operation description. More specifically, the concise instruction generator 408 can be based on the seq2seq model (and/or the pointer-generator network) described by Abigail See, Peter J. Liu, and Christopher D. Manning in *Get to the Point: Summarization with Pointer-Generator Networks*, CoRR abs/1704.04368 (2017), which is incorporated by reference herein in its entirety. Indeed, in some embodiments, the in-app instruction system 102 utilizes one or more of the components (e.g., an encoder, a decoder, and an attention mechanism, and an output generator) or neural networks described in *Get to the Point: Summarization with Pointer-Generator Networks*.

Utilizing the concise instruction generator 408, the in-app instruction system 102 determines an attention vector (e.g., the attention distribution $a^t$) over the hidden states of the encoder 402. For instance, the in-app instruction system 102 determines the attention vector (which differs from the attention vector described above) in accordance with:

$$e_i^t = v^T \tan h(W_h h_i + W_s s_t + b_{attn})$$

$$a^t = \text{softmax}(e^t)$$

where $v^T$, $W_h$, $W_s$, and $b_{attn}$ are learnable parameters or weights, t is the time step (or timestamp) in decoding, $a^t$ is the attention distribution (which can be viewed as a probability distribution over words in the operation description that tells the decoder 406 where to look to produce the next word in a concise instruction), and i represents the hidden state of the encoder 402.

The in-app instruction system 102 further determines a context vector as shown in FIG. 4. For example, the in-app instruction system 102 determines a context vector as given by:

$$h_t^* = \sum_{i \in [1 \ldots n]} a_i^t h_i$$

where $h_t^*$ represents the context vector, as shown in FIG. 4. The context vector $h_t^*$ can be viewed as a weighted sum of the encoder hidden states that is a fixed-size representation of what has been read from the operation description at the time step t.

Additionally, the in-app instruction system 102 determines a copy probability and a generation probability. Particularly, the in-app instruction system 102 determines a copy probability that indicates a likelihood of selecting a word from the operation description to utilize within the concise instruction. The in-app instruction system 102 also determines a generation probability that indicates a likelihood of generating a new word (not in the operation description) from a vocabulary of known words associated with the multi-task summarization neural network (e.g., stored within a database). For example, the in-app instruction system 102 determines the generation probability $p_{gen}$ as given by:

$$p_{gen} = \sigma(w_h^T \cdot h_t^* + w_s^T s_t + w_x^T x_t + b_{ptr})$$

where $x_t$ is the input to the decoder 406 at the time step t, vectors $w_h^*$, $w_s$, $w_x$, and the scalar $b_{ptr}$ are learnable parameters, and $\sigma$ is the sigmoid function. The in-app instruction system 102 further determines the copy probability as $(1-p_{gen})$. Thus, the in-app instruction system 102 can utilize $p_{gen}$ as a soft switch between generating a word from the vocabulary or copying a word from the operation description.

Additionally, the in-app instruction system 102 generates a vocabulary distribution 407 based on the decoder 406 and the context vector. For example, the in-app instruction system 102 generates the vocabulary distribution 407 that indicates a probability distribution over all words within a vocabulary of the multi-task summarization neural network. The in-app instruction system 102 generates the vocabulary distribution 407 as given by:

$$P_{vocab} = \text{softmax}(V(V[s_t, h_t^*, c]+b)+b')$$

where $P_{vocab}$ is the vocabulary distribution 407, where V, V', b, and b' are learnable parameters, and where c is the selected coach mark. In other words, the in-app instruction system 102 generates the generation probability based on the selected coachmark, making the generator consider not only the decoder hidden states and the context vector but also the coachmark information. In other words, the decoder is conditioned based on the coachmark. Thus, the concise instruction is generated taking into account the coachmark that will be used in connection with the concise instruction.

The in-app instruction system 102 further utilizes the generation probability $p_{gen}$, the copy probability $(1-p_{gen})$, and the vocabulary distribution 407 ($P_{vocab}$) to generate a final distribution 409. In particular, the in-app instruction system 102 generates the final distribution 409 in accordance with:

$$P(w) = p_{gen} * P_{vocab}(w) + (1 - p_{gen}) * \sum_{i:w_i=w} a_i^t$$

where P(w) is the final distribution 409 representing a combination of generation probabilities and copy probabilities, and where $p_{gen} * P_{vocab}(w)$ indicates a probabilities of selecting words from the particular vocabulary distribution 407 and $(1-p_{gen}) * \Sigma_{i:w_i=w} a_i^t$ indicates probabilities of selecting words from the attention distribution $a^t$.

Based on the final distribution 409, the in-app instruction system 102 determines a selected word 410 for the current time stamp t. For example, the in-app instruction system 102 selects a word with a highest probability within the final distribution 409 to include within the concise instruction at a particular position corresponding to the time step t. The in-app instruction system 102 thus generates multiple final distributions for successive time steps the continue selecting words to sequentially add to a concise instruction until a threshold number of time steps is reached or until a threshold number of words is included within the concise instruction.

The in-app instruction system 102 can apply the multi-task summarization neural network to generate the coachmark probability distributions for each of the operations and similarly vocabulary distributions. The in-app instruction system 102 can then select or obtain a coachmark and a concise instruction based on the probability distributions. For example, the in-app instruction system 102 selects a coachmark and a concise instruction based on:

$$c, y = \text{Model}(x)$$

$$c^* = \text{argmax}(c)$$

$$y_i^* = \text{argmax}(y_i)$$

where c is a probability distribution over coachmark identifiers and $y=(y_1, y_2, \ldots y_m)$ is the output sequence of the probability distribution over words in a vocabulary. The in-app instruction system 102 continues generating the output sequence until equation of state ("EOS") is obtained.

Figure 5:
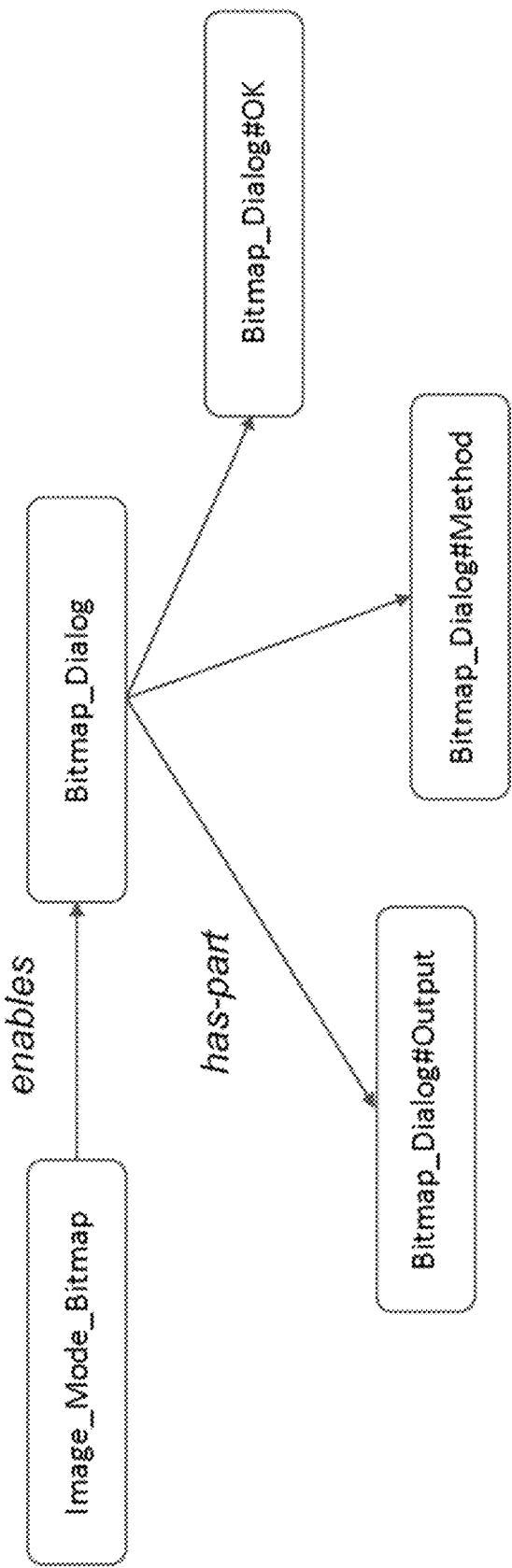
FIG. 5 illustrates a knowledge graph representing relationships between coachmarks in accordance with one or more embodiments.

As mentioned, the in-app instruction system 102 can generate multiple coachmarks as part of guiding a user through various operations of a tutorial. In particular, the in-app instruction system 102 can generate multiple coachmarks independently of each other (as described above) or can jointly generate multiple coachmarks based on relationships between the coachmarks. FIG. 5 illustrates an example knowledge graph depicting relationships associated with various user interface elements for generating coachmarks in accordance with one or more embodiments.

As illustrated in FIG. 5, the in-app instruction system 102 the in-app instruction system 102 determines relationships between various user interface elements such as the "Bitmap_Dialog #Output" element, the "Bitmap_Dialog #Method" element, and the "Bitmap_Dialog #OK" element. In particular, the in-app instruction system 102 determines that each of these three user interface elements is within the same portion of the user interface (e.g., the "Bitmap_Dialog" window). In addition, the in-app instruction system 102 determines that the "Bitmap_Dialog" window can be found within a particular nested menu of the client application 110 (e.g., the "Image_Mode_Bitmap" menu.

Indeed, FIG. 5 illustrates a nesting or a hierarchy of user interface elements with which a user is to interact to access a particular user interface element indicated by a coachmark. For instance, the coachmark 204 of FIG. 2 indicates the "Bitmap_Dialog #Output" interface element within the user interface 200. Using the user interface 200 of FIG. 2 as an example, the in-app instruction system 102 determines how to access the "Bitmap_Dialog #Output" element within the client application 110.

As shown in FIG. 5, the in-app instruction system 102 determines that the "Bitmap_Dialog #Output" is located within the "Bitmap_Dialog" window of the client application 110. To access the "Bitmap_Dialog" window of the client application 110, the in-app instruction system 102 further determines that the user must click on an "Image" menu, then a "Mode" menu within the "Image" menu, and a "Bitmap" window within the "Mode" menu (as indicated by the "Image_Mode_Bitmap" notation). In some embodiments, the in-app instruction system 102 generates and provides coachmarks and concise instructions for each of the steps involved in accessing the "Bitmap_Dialog #Output" interface element to guide the user through the various interactions with each of the menus. Indeed, additional detail regarding guiding a user through the operations involved in interacting with the "Bitmap_Dialog #Output" interface element is provided below with reference to FIGS. 7-10.

Figure 6:
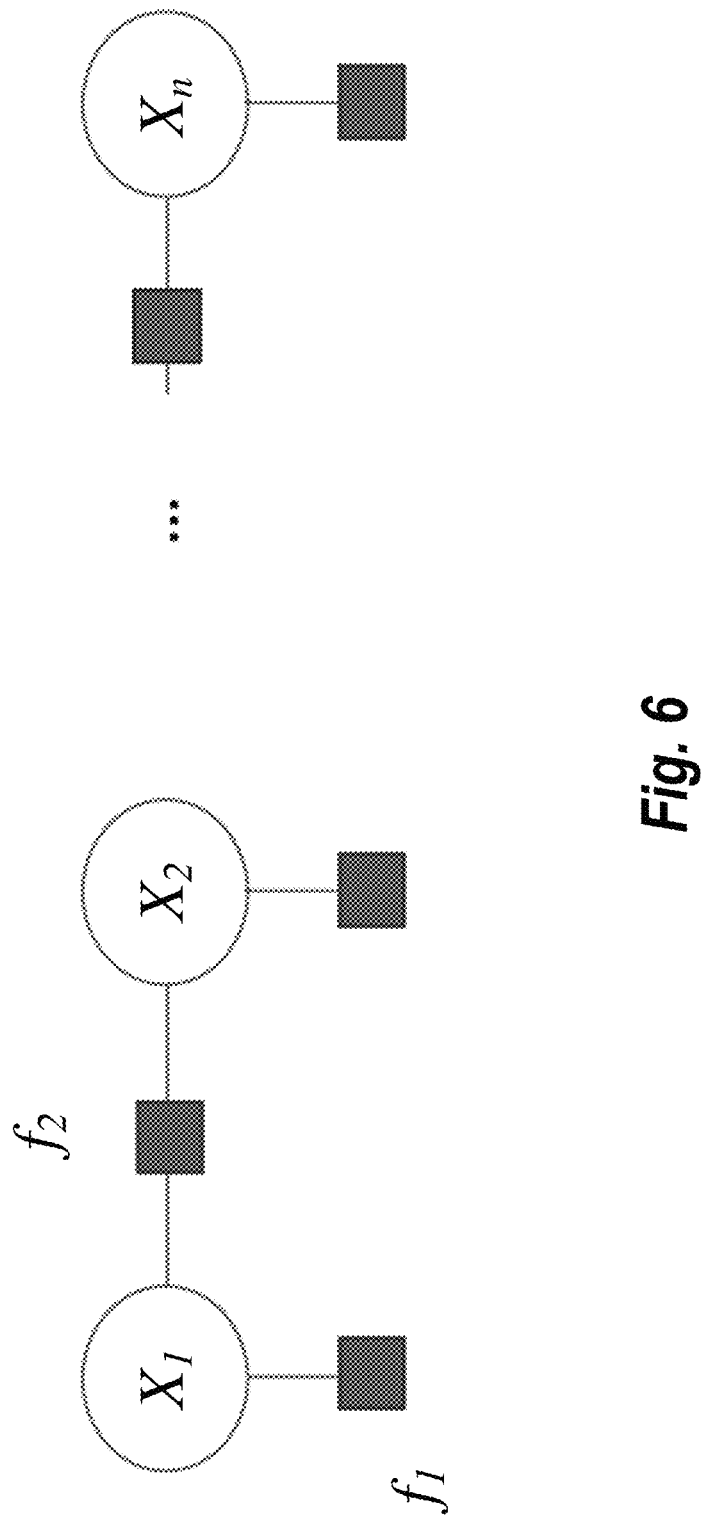
FIG. 6 illustrates a factor graph for jointly generating multiple coachmarks in accordance with one or more embodiments.

FIG. 6 illustrates a factor graph for joint coachmark inference in accordance with one or more embodiments. As illustrated in FIG. 6, the in-app instruction system 102 implements the joint inference or joint generation of coachmarks with two steps. First, the in-app instruction system 102 the in-app instruction system 102 determines a coachmark probability distribution for each of the operations associated with a particular operation. For example, the in-app instruction system 102 applies the multi-task summarization neural network to independently generate the coachmark probability distributions for each of the operations.

Second, the in-app instruction system 102 jointly infers or determines coachmark identifiers based on a factor graph like the one shown in FIG. 6. As illustrated in FIG. 6, the unary factor $f_1$ is c from c,y=Model(x). The factor $f_1$ indicates likelihood scores of coachmarks when operations are independently considered. The binary factor $f_2$ indicates a relationship between two coachmarks $X_1$ and $X_2$. If the value of $f_2$ is high, then the in-app instruction system 102 determines that the two coachmarks $X_1$ and $X_2$ are closely related. In some embodiments, the in-app instruction system 102 determines the binary factor $f_2$ in accordance with:

$$f_2(X_1, X_2) = \frac{1}{\text{distance between } X_1 \text{ and } X_2 \text{ in the knowledge graph}}$$

where the distance in the knowledge graph refers to the number of links (or nodes) between $X_1$ and $X_2$ within a knowledge graph like the one illustrated in FIG. 5. For example, the distance between "Bitmap_Dialog #Output" and "Bitmap_Dialog" in FIG. 5 is 1. Thus, $f_2$ is the inverse of the distance between the two coachmarks $X_1$ and $X_2$. If the two coachmarks $X_1$ and $X_2$ are directly connected, then $f_2$ is 1. If they are unconnected, then $f_2$ is 0 (or a very small, negligible number for stability). The in-app instruction system 102 further utilizes Gibbs sampling or loop belief propagation to infer or determine the best overall assignments (e.g., to determine the coachmarks that best match an operation description and/or other coachmarks).

As an alternative method to generating $f_2$, the in-app instruction system 102 can utilize a graph embedding technique. For example, the in-app instruction system 102 can utilize a graph embedding technique to derive embedding vectors of coachmark identifiers and determine cosine similarities between them to measure their relatedness. In some embodiments, the in-app instruction system 102 utilizes the graph embedding technique described by Zonghan Wu, Shirui Pan, Fengwen Chen, Guodong Long, Chengqi Zhang, and Philip S. Yu in *A Comprehensive Survey on Graph Neural Networks*, CoRR abs 1901.00596 (2019), which is incorporated herein by reference in its entirety.

Figure 7:
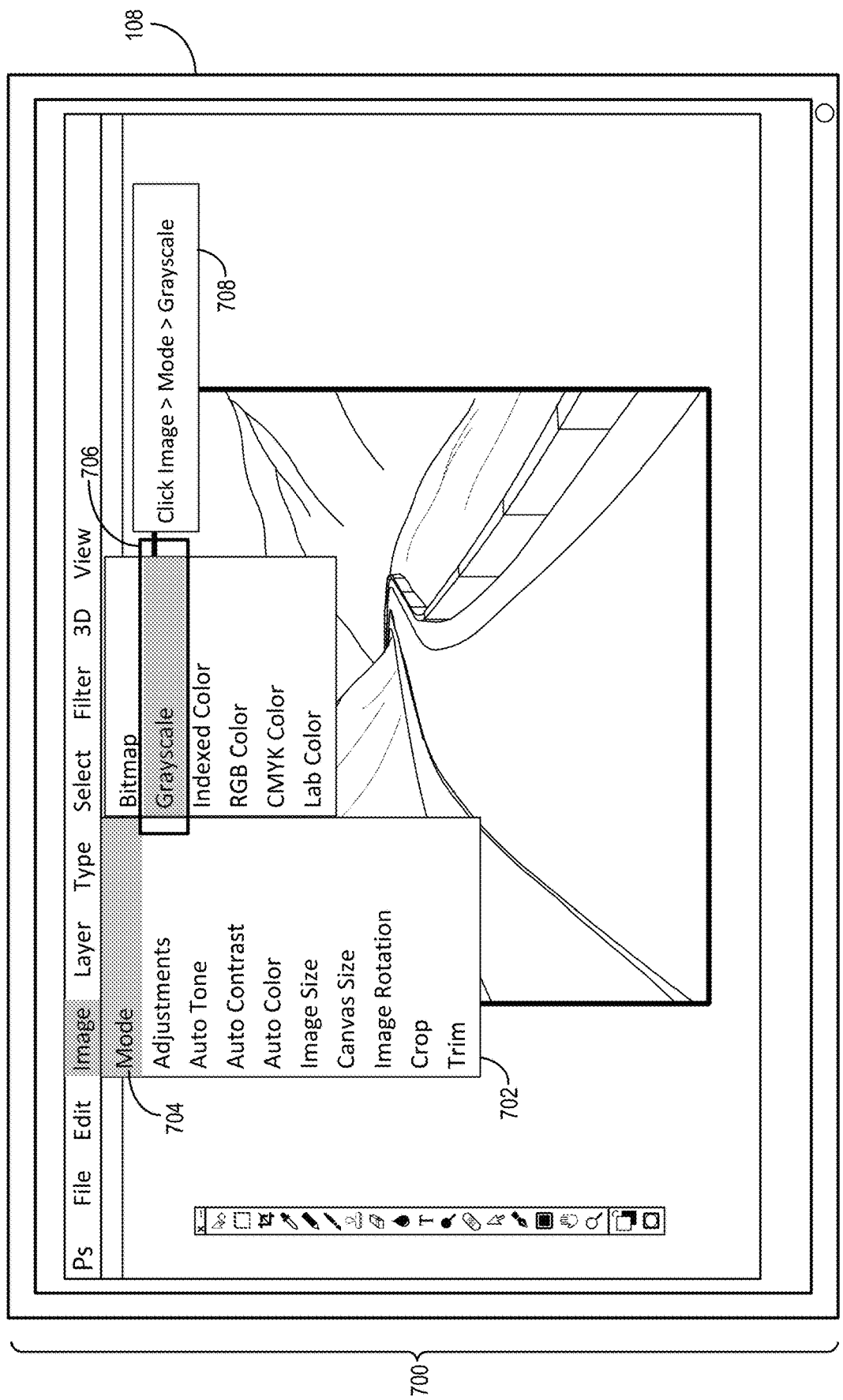
FIGS. 7-10 illustrate user interface on a client device displaying coachmarks and concise instructions for guiding a user through various operations of a tutorial in accordance with one or more embodiments.
Figure 8:
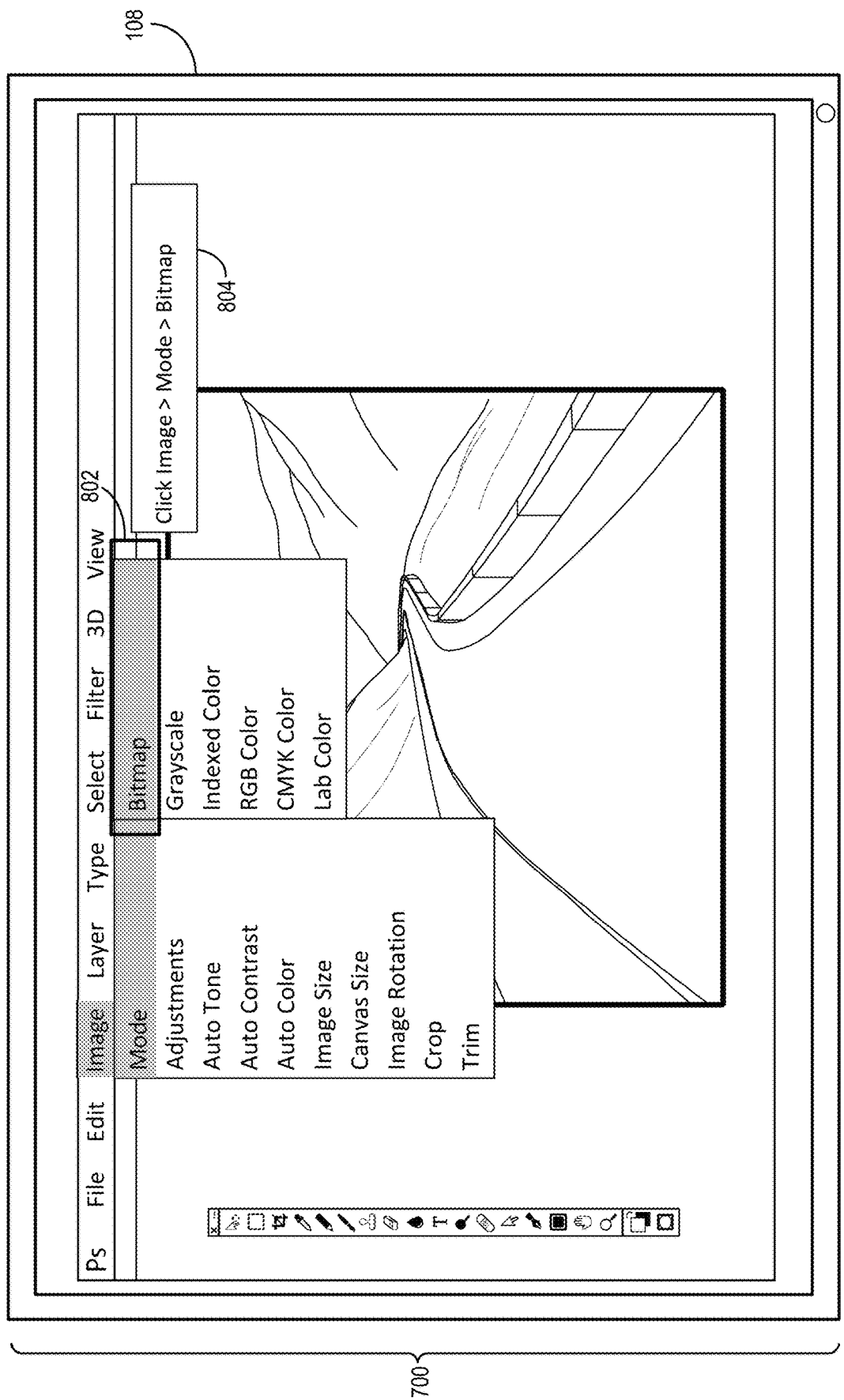
Figure 9:
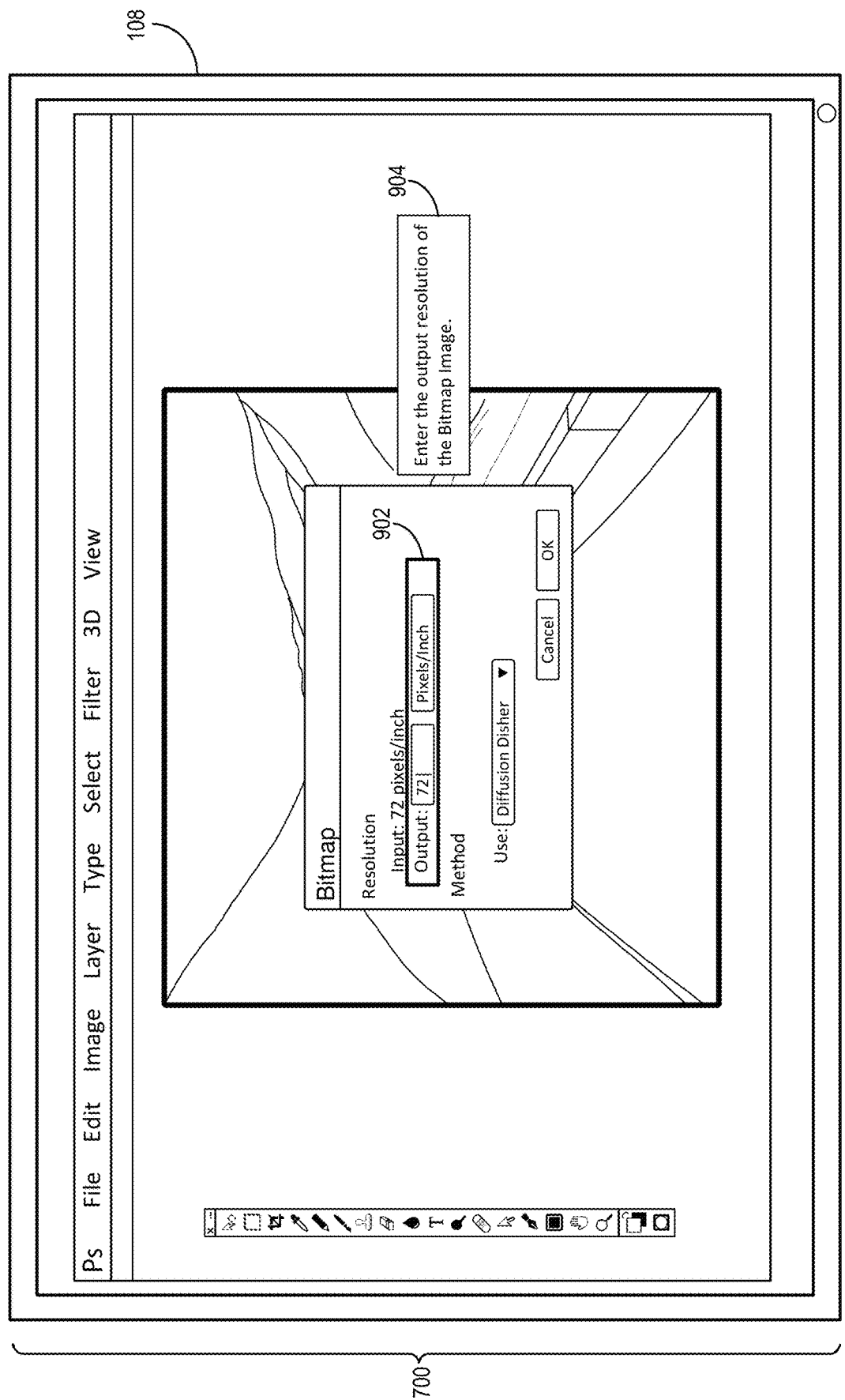
Figure 10:
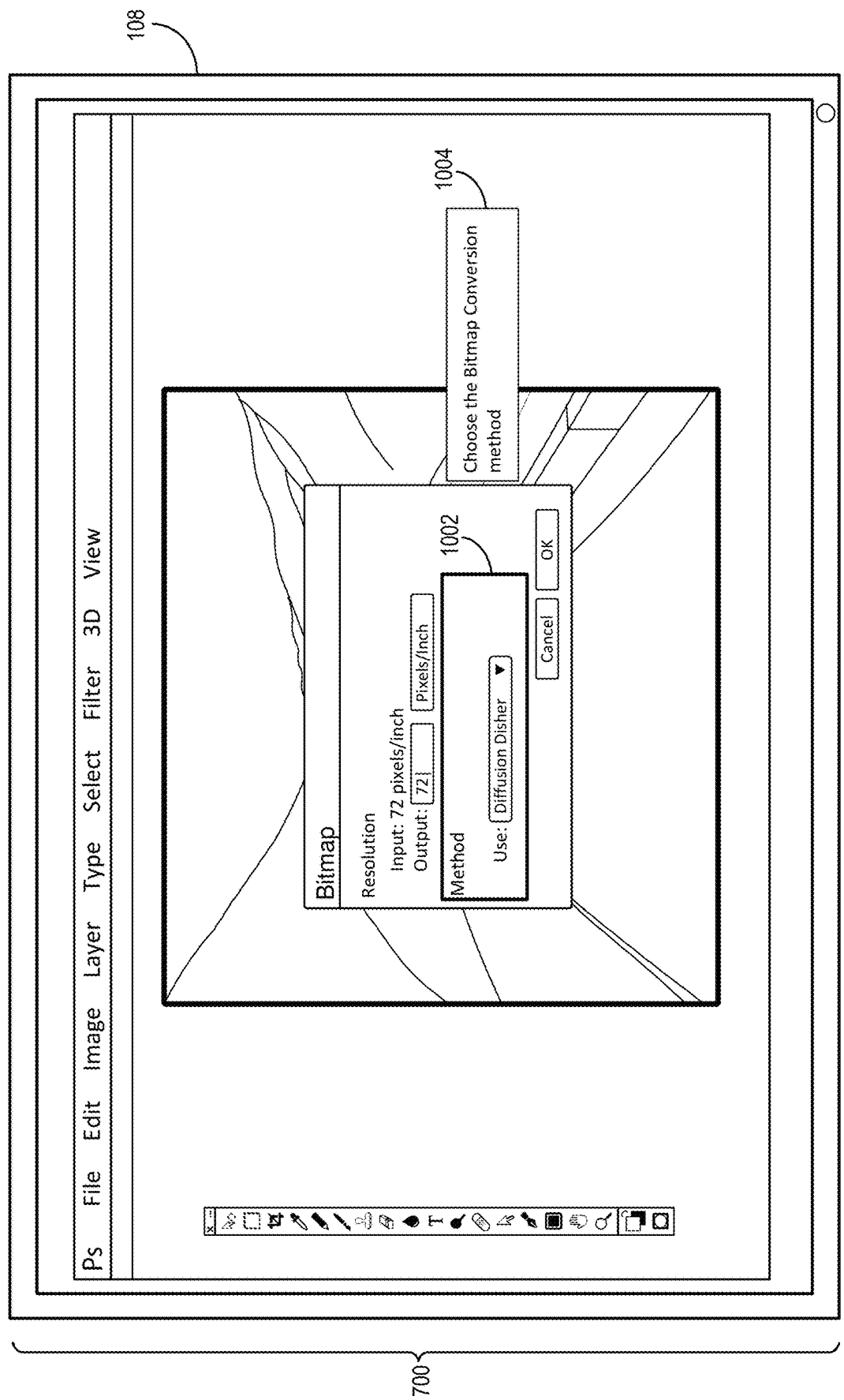

As mentioned above, the in-app instruction system 102 can generate coachmarks and concise instructions to provide for display on a client device (e.g., the client device 108). FIGS. 7-10 illustrate various coachmarks and corresponding concise instructions that the in-app instruction system 102 generates and provides for display within a user interface 700 on the client device 108 in accordance with one or more embodiments. Specifically, FIG. 7 illustrates a coachmark 706 and a corresponding concise instruction 708 for guiding a user through an operation associated with a tutorial. Thereafter, FIGS. 8-10 illustrate subsequent coachmarks and concise instructions that the in-app instruction system 102 generates (e.g., independently or jointly) and provides for display on the client device 108 corresponding to subsequent operations of the same tutorial.

As illustrated in FIG. 7, the in-app instruction system 102 generates the coachmark 706 to indicate a user interface element with which a user is to interact to perform an operation. More specifically, the in-app instruction system 102 generates the coachmark 706 to indicate a selectable "Grayscale" element within a "Mode" menu. In addition, the in-app instruction system 102 generates the concise instruction 708 to instruct the user to navigate to and select the "Grayscale" element by clicking "Image," "Mode," and "Grayscale." Indeed, the in-app instruction system 102 utilizes a multi-task summarization neural network to analyze an operation description such as "Do one of the following: If the image is in color, choose Image>Mode>Grayscale. Then choose Image>Mode>Bitmap. If the image is in grayscale, choose Image>Mode>Bitmap."

Based on analyzing the text of this operation description, the in-app instruction system 102 generates the concise instruction 708 to instruct the user to open the Image menu 702, then to open the Mode menu by selecting the "Mode" element 704, and then to select the Grayscale option within the Mode menu. In some embodiments, the in-app instruction system 102 can open one or more of the menus automatically (e.g., without user input) to display the coachmark 706 for the final part of the operation indicated by the concise instruction 708. In any event, the in-app instruction system 102 generates the concise instruction 708 and the coachmark 706 to much more succinctly and efficiently guide the user to perform the operation(s).

The in-app instruction system 102 further generates and provides coachmarks and concise instructions for subsequent operations for the tutorial as well. Continuing the tutorial from FIG. 7 to FIG. 8, FIG. 8 illustrates a coachmark 802 and a corresponding concise instruction 804 for a second operation as part of the tutorial. Specifically, the in-app instruction system 102 utilizes a multi-task summarization neural network to generate the coachmark 802 and the concise instruction 804 from the same operation description as mentioned above in relation to FIG. 7. For example, the in-app instruction system 102 determines that the depicted digital image is in color to first generate and provide the coachmark 706 and the concise instruction 708 and to then generate the coachmark 802 and the concise instruction 804. Indeed, as shown, the in-app instruction system 102 generates the coachmark 802 and the concise instruction 804 to guide the user through the operation of opening a Bitmap window.

Continuing the example to FIG. 9, the in-app instruction system 102 utilizes the multi-task summarization neural network to generate a coachmark 902 and a concise instruction 904 based on the operation description "For Output, enter a value for the output resolution of the Bitmap mode image, and choose a unit of measurement. By default, the current image resolution appears as both the input and the output resolutions." Indeed, the in-app instruction system 102 analyzes the operation description to summarize it and generate the concise instruction 904 to guide the user to "Enter the output resolution of the Bitmap image." Additionally, the in-app instruction system 102 generates and provides the coachmark 902 to indicate a user interface element (e.g., the Output input field) with which the user is to interact to perform the operation.

Continuing the example to FIG. 10, the in-app instruction system 102 generates a coachmark 1002 and a concise instruction 1004 for display within the user interface 700. In particular, the in-app instruction system 102 utilizes the multi-task summarization neural network to analyze an operation description of "Choose one of the following bitmap conversion methods from the Use pop-up menu: 50% Threshold . . . Pattern Dither . . . Diffusion Dither . . . Halftone Screen . . . Custom Pattern." Based on the operation description, the in-app instruction system 102 generates the coachmark 1002 and the concise instruction 1004 to guide the user to "Choose the Bitmap Conversion method." In addition, the in-app instruction system 102 places the concise instruction 1004 in a location within the user interface 700 based on the location of the coachmark 1002 so that the user can easily read and interpret the concise instruction 1004 with the context provided by the coachmark 1002.

Figure 11:
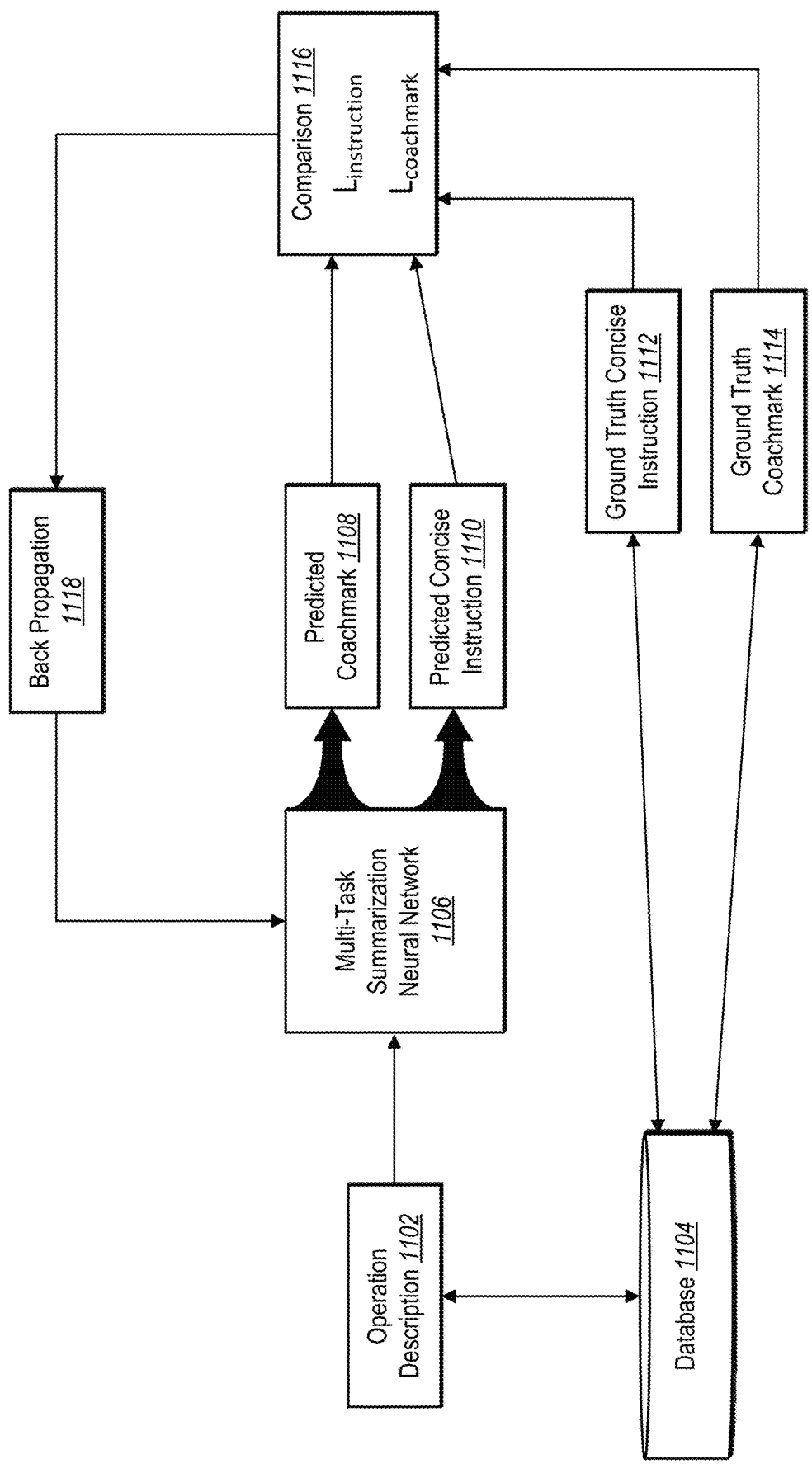
FIG. 11 illustrates a schematic diagram of a process of training a multi-task summarization neural network in accordance with one or more embodiments.

As mentioned, the in-app instruction system 102 can train a multi-task summarization neural network (e.g., the multi-task summarization neural network 304) to generate coachmarks and concise instructions. In particular, the in-app instruction system 102 can train the multi-task summarization neural network 304 in a multi-task training manner based on operation descriptions, ground truth concise instructions, and ground truth coachmarks. FIG. 11 illustrates training a multi-task summarization neural network 1106 (e.g., the multi-task summarization neural network 304) in accordance with one or more embodiments.

As illustrated, the in-app instruction system 102 accesses an operation description 1102 from a database 1104 (e.g., the database of operation descriptions 302). The in-app instruction system 102 further inputs the operation description 1102 into the multi-task summarization neural network 1106. Based on the input operation description 1102, the multi-task summarization neural network 1006 generates a predicted coachmark 1108 and a predicted concise instruction 1110. That is, the multi-task summarization neural network 1106 generates a number of predicted words for respective time steps as part of a predicted concise instruction 1110. In particular, the multi-task summarization neural network 1106 generates the predicted coachmark 1108 and the predicted concise instruction 1110 based on analyzing the operation description 1102 in accordance with internal weights and parameters of the multi-task summarization neural network 1106.

As further illustrated in FIG. 11, the in-app instruction system 102 identifies a ground truth concise instruction 1112 and a ground truth coachmark 1114 to compare with their predicted counterparts. More specifically, the in-app instruction system 102 accesses the ground truth concise instruction 1112 from the database 1104, where the ground truth concise instruction 1112 corresponds to (e.g., matches) the operation description 1102. Similarly, the in-app instruction system 102 accesses the ground truth coachmark 1114 that corresponds to the operation description 1102.

Further, the in-app instruction system 102 compares the ground truth coachmark 1114 and the ground truth concise instruction 1112 with the predicted coachmark 1108 and the predicted concise instruction 1110. More specifically, the in-app instruction system 102 performs a comparison 1116 to compare the ground truth concise instruction 1112 with the predicted concise instruction 1110 and to compare the ground truth coachmark 1114 with the predicted coachmark 1108. In some embodiments, the in-app instruction system 102 performs the comparison 1116 utilizing a loss function to determine a measure of loss or error associated with the multi-task summarization neural network 1106 (e.g., based on how close the predictions are to the ground truths).

For instance, the in-app instruction system 102 determines a loss for the multi-task summarization neural network 1106 based on a coachmark loss $L_{coachmark}$ and a concise instruction loss $L_{instruction}$. In some embodiments, the in-app instruction system 102 determines the overall loss for the multi-task summarization neural network 1106 in accordance with:

$$L = L_{instruction} + \lambda_1 L_{coachmark}$$

where $\lambda_1$ represents a hyper-parameter for balancing the two losses, $L_{instruction}$ and $L_{coachmark}$. In one or more embodiments, $\lambda_1 = 5$ to generate predicted coachmarks and predicted concise instructions.

In the same or other embodiments, the in-app instruction system 102 determines the concise instruction loss in accordance with:

$$L_{instruction} = \frac{1}{T} \sum_{t=0}^{T} loss_t + \lambda_2 \sum_i \min(a_i^t, c_i^t)$$

where $$loss_t = -\log P(w_t^*)$$

and where $a_i$ is defined above as $a_i = \text{softmax}(W_a r_i)$ for $i=1$, n, T is a total number of time steps or time increments, t is a time step or a timestamp, $w_t^*$ is a ground truth word as part of the ground truth concise instruction 1112 at timestamp t, and $c = \text{softmax}(\text{FFN}(f_x))$. In some embodiments, the in-app instruction system 102 sets $\lambda_2 = 1$.

Additionally, the in-app instruction system 102 determines the coachmark loss as given by:

$$L_{coachmark} = \text{CrossEntropy}(c, c^*)$$

where $c^*$ is the ground truth coachmark 1114 (e.g., as given by $c^* = \text{argmax}(c)$). In some embodiments, the in-app instruction system 102 utilizes a loss function other than cross entropy loss such as a mean square error loss function, a hinge loss function, or an exponential loss function. In these or other embodiments, the in-app instruction system 102 trains the multi-task summarization neural network 1106 using an Adagrad optimizer (or some other optimizer) with a learning rate of 0.15 and an initial accumulator value of 0.1. Additionally, the in-app instruction system uses a gradient clipping technique with a maximum gradient norm of 2.

Based on the comparison 1116, the in-app instruction system 102 determines a measure of error (or a measure of accuracy) associated with the multi-task summarization neural network 1106. To improve the predictions generated by the multi-task summarization neural network 1106, the in-app instruction system 102 further performs a back propagation 1118. In particular, the in-app instruction system 102 back propagates to adjust or modify various internal weights or parameters associated with neurons and/or layers of the multi-task summarization neural network 1106. By modifying the weights and parameters, the in-app instruction system 102 changes how the multi-task summarization neural network 1106 passes data from one layer to the next, and therefore modifies how the multi-task summarization neural network 1106 generates predictions.

Upon modifying the weights and parameters of the multi-task summarization neural network 1106, the in-app instruction system 102 further repeats the process illustrated in FIG. 11. That is, the in-app instruction system 102 identifies another operation description to input into the multi-task summarization neural network 1106, whereupon the multi-task summarization neural network 1106 generates a new predicted coachmark and a new predicted concise instruction. The in-app instruction system 102 further identifies the ground truth concise instruction and the ground truth coachmark that correspond to the new operation description and compares them with the predictions. The in-app instruction system 102 further back propagates to change weights and parameters to start the process again. By repeating the training process of FIG. 11 for multiple iterations or epochs, the in-app instruction system 102 reduces the error associated with the multi-task summarization neural network 1106 until the error (e.g., the concise instruction error, the coachmark error, and/or the overall error) satisfies an error threshold. Thus, the in-app instruction system 102 trains the multi-task summarization neural network 1106 to generate accurate predictions of coachmarks and concise instructions.

As mentioned, the in-app instruction system 102 can provide various advantages over conventional digital tutorial systems. In particular, experimenters have demonstrated that the in-app instruction system 102 improves in accuracy over conventional systems. FIG. 12 illustrates a table of accuracy improvements associated with the in-app instruction system 102 in accordance with one or more embodiments.

As illustrated in FIG. 12, various configurations of the in-app instruction system 102 generate more accurate coachmarks as compared to other configurations (though any of the configurations are more accurate than conventional systems). The Baseline1 and Baseline2 columns in the table of FIG. 12 each correspond to different configurations of the in-app instruction system 102. Baseline1 is a system much like the overall in-app instruction system except that the Baseline1 system does not implement knowledge-based joint coachmark inference. Baseline2 is likewise similar to the in-app instruction system 102 except that Baseline2 does not utilize a multi-task approach. That is, the coachmark prediction and the concise instruction generation of Baseline2 are conducted separately.

Utilizing a dataset to test the three systems of FIG. 12, experimenters have shown that all three systems generate coachmarks with high levels of accuracy. For example, the dataset includes the PHOTOSHOP online manual called HelpX as a target domain. The dataset includes triples of operation description text, generated concise instructions, and coachmarks for a total of 190 procedure tutorial totaling 600 operations. As shown, the in-app instruction system 102 is most accurate in generating coachmarks, with an accuracy of 0.7548 as compared to the Baseline1 accuracy of 0.7215 and the Baseline2 accuracy of 6822. As further shown, the in-app instruction system 102 generates highly accurate concise instructions based on the Rouge-1 and Rouge-2 metrics for machine summarization tasks.

Figure 13:
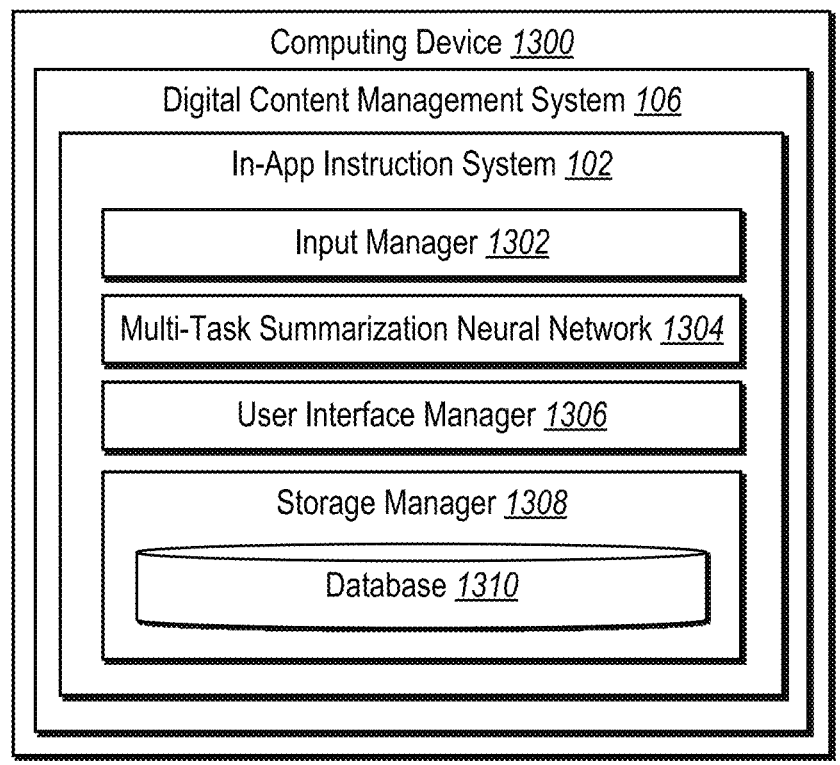
FIG. 13 illustrates a schematic diagram of an in-app instruction system in accordance with one or more embodiments.

Looking now to FIG. 13, additional detail will be provided regarding components and capabilities of the in-app instruction system 102. Specifically, FIG. 13 illustrates an example schematic diagram of the in-app instruction system 102 on an example computing device 1300 (e.g., one or more of the client device 108 and/or the server(s) 104). As shown in FIG. 13, the in-app instruction system 102 may include an input manager 1302, a multi-task summarization neural network manager 1304, a user interface manager 1306, and a storage manager 1308. The storage manager 1308 can include one or more memory devices that store various data such as a repository of descriptions for guiding a user through operations associated with a client application, a plurality of coachmarks corresponding to respective user interface elements associated with the client application, and a multi-task summarization neural network that includes an encoder, a decoder, a coachmark generator, and a concise instruction generator.

As just mentioned, the in-app instruction system 102 includes an input manager 1302. In particular, the input manager 1302 can receive, detect, determine, provide, transmit, or otherwise identify user inputs. For example, the input manager 1302 can receive a user input (or an indication of a user input) to request a tutorial, whereupon the input manager 1302 can communicate with the multi-task summarization neural network manager 1304 to generate an in-app guided edit to provide for display to a client device (e.g., the client device 108) to guide a user through an operation of the requested tutorial. The input manager 1302 can also receive input from a user (or from a client device) to select or otherwise interact with user interface elements as part of performing an operation of a tutorial.

As shown, the in-app instruction system 102 also includes a multi-task summarization neural network manager 1304. In particular, the multi-task summarization neural network manager 1304 can manage, maintain, apply, train, implement, or otherwise utilize a multi-task summarization neural network to generate coachmarks and concise instructions based on operation descriptions. For example, the multi-task summarization neural network manager 1304 can utilize a multi-task summarization neural network to analyze text of an operation description to generate an in-app guided edit that includes a concise instruction and a coachmark. The multi-task summarization neural network manager 1304 can generate a concise instruction, as described herein, by summarizing an operation description and by including words corresponding to a particular coachmark (or user interface element indicated by a coachmark). The multi-task summarization neural network manager 1304 can generate a coachmark by analyzing the text of an operation description, as described herein, to determine a user interface element to highlight within a particular menu or portion of a user interface. In some embodiments, the multi-task summarization neural network manager 1304 communicates with the storage manager 1308 to access operation descriptions within the database 1310 to generate a repository of in-app guided edits for access on demand in response to receiving requests from a client device.

Additionally, the in-app instruction system 102 includes a user interface manager 1306. In particular, the user interface manager 1306 can manage, maintain, present, portray, display, or otherwise represent a user interface including various user interface elements along with a coachmark and a concise instruction. For example, the user interface manager 1306 can communicate with the multi-task summarization neural network manager 1304 to receive an indication of a concise instruction and a coachmark to display within a user interface. In some embodiments, the user interface manager 1306 determines or identifies a user interface element (e.g., based on JSON code) to highlight with a coachmark and further determines or identifies a location to present a concise instruction.

The components of the in-app instruction system 102 can include software, hardware, or both. For example, the components of the in-app instruction system 102 can include one or more instructions stored on a computer-readable storage medium and executable by processors of one or more computing devices (e.g., the computing device 1300). When executed by the one or more processors, the computer-executable instructions of the in-app instruction system 102 can cause the computing device 1100 to perform the methods described herein. Alternatively, the components of the in-app instruction system 102 can comprise hardware, such as a special purpose processing device to perform a certain function or group of functions. Additionally or alternatively, the components of the in-app instruction system 102 can include a combination of computer-executable instructions and hardware.

Furthermore, the components of the in-app instruction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the in-app instruction system 102 may be implemented as part of a stand-alone application on a personal computing device or a mobile device. Alternatively or additionally, the components of the in-app instruction system 102 may be implemented in any application that allows creation and delivery of marketing content to users, including, but not limited to, applications in ADOBE EXPERIENCE MANAGER, ADOBE DOCUMENT CLOUD, and ADOBE CREATIVE CLOUD, such as ADOBE INDESIGN, ADOBE PHOTOSHOP, and ADOBE PREMIERE. "ADOBE," "ADOBE EXPERIENCE MANAGER," "ADOBE DOCUMENT CLOUD," "ADOBE CREATIVE CLOUD," "ADOBE INDESIGN," "ADOBE PHOTO- SHOP," and "ADOBE PREMIERE" are trademarks of Adobe Inc. in the United States and/or other countries.

FIGS. 1-13, the corresponding text, and the examples provide a number of different systems, methods, and non-transitory computer readable media for generating and providing a coachmark and a concise instruction based on an operation description. In addition to the foregoing, embodiments can also be described in terms of flowcharts comprising acts for accomplishing a particular result. For example, FIG. 14 illustrates a flowchart of an example sequence or series of acts in accordance with one or more embodiments.

Figure 14:
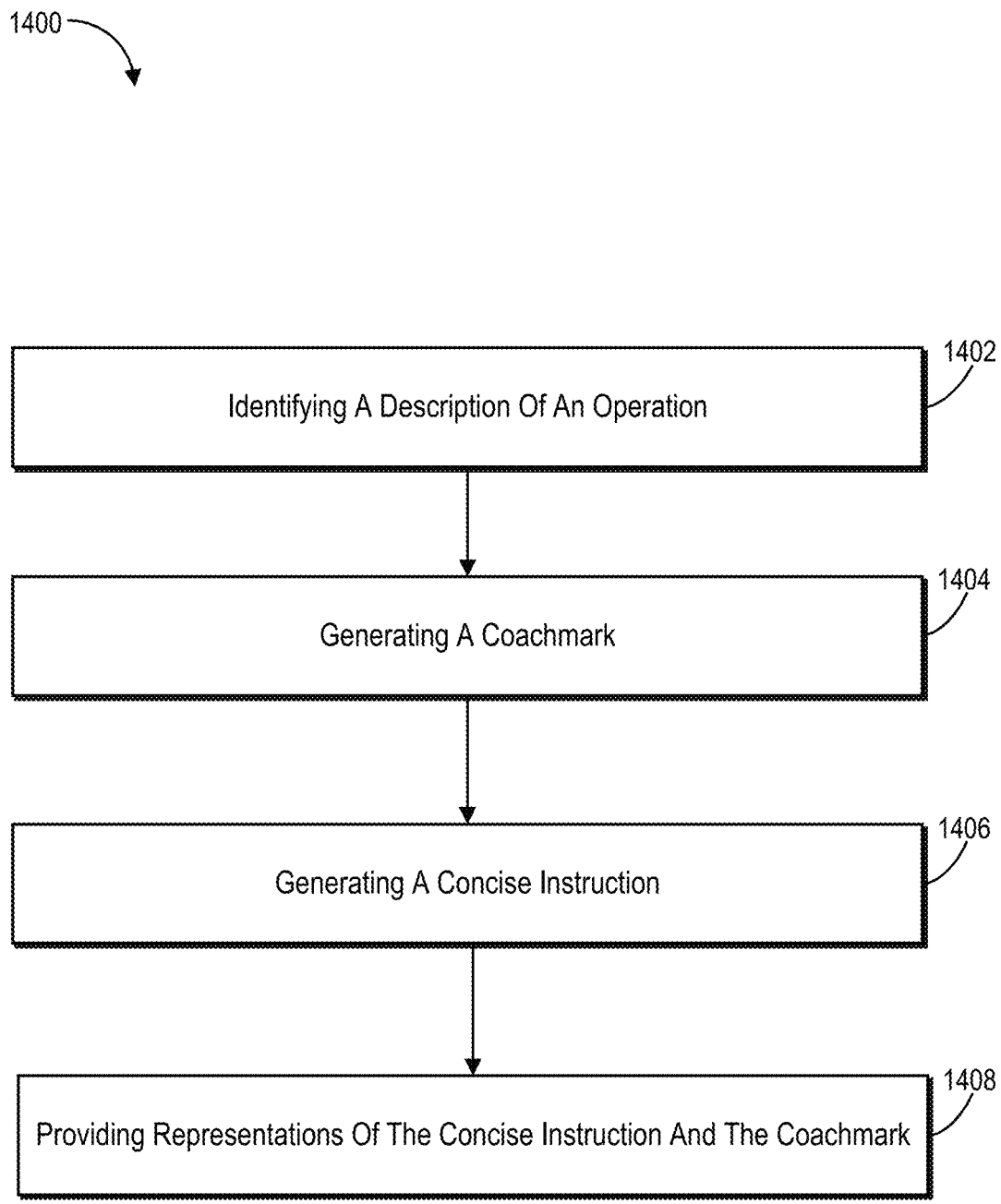
FIG. 14 illustrates a flowchart of a series of acts for generating and providing a coachmark and a concise instruction in accordance with one or more embodiments.

While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14. Additionally, the acts described herein may be repeated or performed in parallel with one another or in parallel with different instances of the same or other similar acts.

FIG. 14 illustrates an example series of acts 1400 for generating and providing a coachmark and a concise instruction based on an operation description. In particular, the series of acts 1400 includes an act 1402 of identifying a description of an operation. For example, the act 1402 can involve identifying, from a repository of descriptions for guiding a user through operations associated with a client application, a description of an operation to perform within the client application.

In addition, the series of acts 1400 includes an act 1404 of generating a coachmark. In particular, the act 1404 can involve generating, utilizing a multi-task summarization neural network, a coachmark that indicates a user interface element associated with the operation within the client application. For example, the act 1406 can involve utilizing the multi-task summarization neural network to determine, for a plurality of coachmark identifiers, respective probabilities that the coachmark identifiers correspond to the description of the operation and to identify, from the plurality of coachmark identifiers, a coachmark identifier with a highest probability. In some embodiments, the multi-task summarization neural network can include an encoder, a decoder, a coachmark generator, and a concise instruction generator. In these or other embodiments, the act 1406 can involve conditioning the decoder based on the coachmark.

In some embodiments, the act 1406 can involve determining, from the plurality of coachmarks, a coachmark that indicates a user interface element associated with the description of the operation by utilizing the encoder to generate encoder vector representations of the description and utilizing the coachmark generator to generate a first probability distribution indicating respective probabilities of the plurality of coachmarks corresponding to the description based on the encoder vector representations. In some embodiments, a coachmark can include a visual indicator for display to indicate a particular user interface element that a user is to interact with as part of performing the operation.

As shown, the series of acts 1400 includes an act 1406 of generating a concise instruction. In particular, the act 1406 can involve generating, utilizing a multi-task summarization neural network, a concise instruction that includes a shortened version of the description of the operation. For example, the act 1406 can involve utilizing the multi-task summarization neural network to generate a sequence of vector representations corresponding to words from the description of the operation and to determine, for successive time steps associated with the multi-task summarization neural network and based on the sequence of vector representations: copy probabilities indicating likelihoods of selecting words from the description of the operation to utilize within the concise instruction and generation probabilities indicating likelihoods of selecting new words from a vocabulary to utilize within the concise instruction.

In some embodiments, the act 1406 can involve generating a concise instruction corresponding to the coachmark by utilizing the decoder to generate a sequence of decoder vector representations based on the encoder vector representations and by utilizing the concise instruction generator to generate a second probability distribution indicating respective probabilities of words corresponding to the operation based on the sequence of decoder vector representations. The act 1406 can involve generating the concise instruction to include one or more words that correspond to the coachmark. For example, the act 1406 can involve generating the second probability distribution based further on the coachmark. Additionally (or alternatively), the act 1406 can involve generating the concise instruction to include a first word from the description of the operation and a second word from a vocabulary associated with the multi-task summarization neural network. The act 1406 can also (or alternatively) involve determining that the coachmark has a highest probability from among the plurality of coachmarks associated with the first probability distribution.

Further, the series of acts 1400 includes an act 1408 of providing representations of the concise instruction and the coachmark. In particular, the act 1408 can involve providing, for display within a user interface of the client application, representations of the concise instruction and the coachmark. For example, the act 1408 can involve providing the coachmark for display in a position to outline a user interface element within the user interface and providing the concise instruction for display in a position within the user interface based on the position of the coachmark. The series of acts 1400 can also include an act of receiving a request to access a tutorial for performing the operation from a client device running the client application as well as an act of providing the representations of the concise instruction and the coachmark to the client device in response to the request.

The series of acts 1400 can include an act of to jointly generating the coachmark and the concise instruction utilizing the multi-task summarization neural network. In addition, the series of acts 1400 can include an act of jointly generate multiple coachmarks for multiple operations based on determining relationships between the multiple coachmarks. The series of acts 1400 can also include an act of training the multi-task summarization neural network to generate the coachmark and the concise instruction based on a coachmark loss and a concise instruction loss.

The series of acts 1400 can include an act of utilizing the multi-task summarization neural network to generate a second coachmark for a second operation independent from the coachmark associated with the operation. The series of acts 1400 can also (or alternatively) include an act of jointly generating a third coachmark for a third operation based on determining a relationship between the coachmark and the third coachmark.

Figure 15:
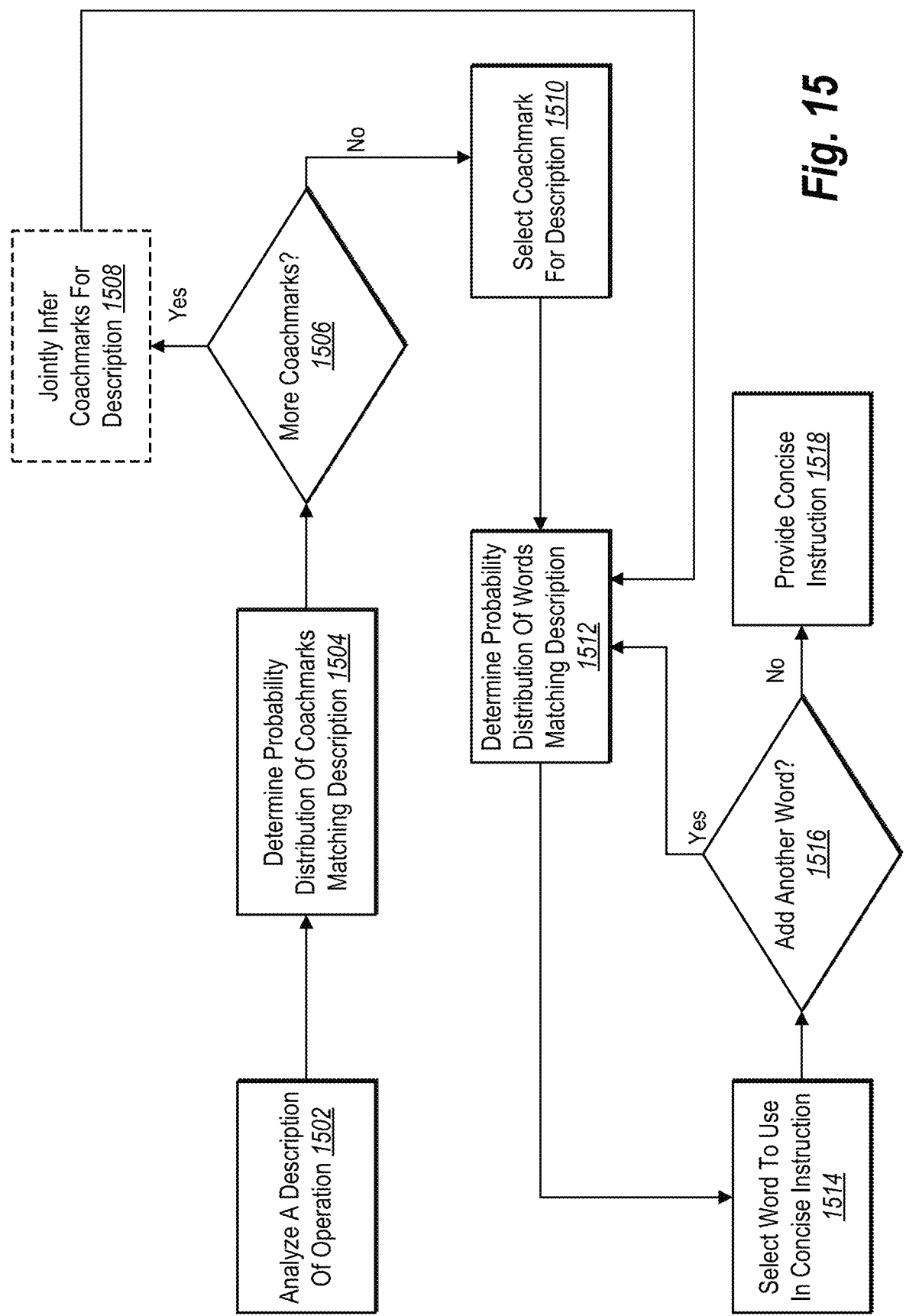
FIG. 15 illustrates a series of acts involved in performing a step for generating a concise instruction and a coachmark based on the description of the operation in accordance with one or more embodiments.

In some embodiments, the in-app instruction system 102 can perform a step for generating a concise instruction and a coachmark based on the description of the operation. In particular, the in-app instruction system 102 can perform a series of acts to perform the step for generating a concise instruction and a coachmark based on the description of the operation. FIG. 15 illustrates a series of acts 1502-1518 that the in-app instruction system 102 performs to perform the step for generating a concise instruction and a coachmark based on the description of the operation in accordance with one or more embodiments. The series of acts 1502-1518 therefore provides algorithm or corresponding structure for performing the step for generating a concise instruction and a coachmark based on the description of the operation.

As illustrated in FIG. 15, the in-app instruction system 102 performs an act 1502 to analyze a description of an operation. In particular, the in-app instruction system 102 analyzes an operation description by applying a multi-task summarization neural network to analyze the text of the operation description. For example, the in-app instruction system 102 analyze the operation description to identify individual words, generate embeddings for the words, the use a bi-lateral LSTM to generate encoder hidden states. Act 1502 can also involve applying a self-attention mechanism to pick important works. For example, the act 1502 can involve utilizing a MLP to generate importance representation vectors. Act 1502 can further involve pushing the importance representation vectors through an attention weight matrix and normalizing the result to generate self-attention vectors. Act 1502 can then involve combining the self-attention vectors with the encoder hidden vectors.

In addition, the in-app instruction system 102 performs an act 1504 to determine a probability distribution of coachmarks matching the operation description. More specifically, the in-app instruction system 102 utilizes a multi-task summarization neural network (the architecture of which is described above) to determine a probability distribution that one or more coachmarks corresponds to the text of the operation description. For example, act 1504 can involve feeding the combination of the self-attention vectors and the encoder hidden vectors through a feed forward network with a SoftMax classifier to generate a probability distribution over the coachmarks.

The in-app instruction system 102 further performs an act 1506 to determine whether or not there are more coachmarks that are to be included within a tutorial. For example, the in-app instruction system 102 determines whether there are additional operations or acts for a user to perform as part of the tutorial to carry out the task.

Upon determining that there are more coachmarks, in-app instruction system 102 can generate probability distribution over the coachmarks for the additional operations. The in-app instruction system 102 performs an act 1508 to jointly infer coachmarks for an operation description. Indeed, the in-app instruction system 102 infers which coachmarks to select based on a tutorial including multiple operations that correspond to different coachmarks that lead one to the other. More specifically, the in-app instruction system 102 utilizes the joint coachmark inference technique described above in relation to the factor graph of FIG. 6.

Upon determining that there are no more coachmarks, the in-app instruction system 102 performs an act 1510 to select a coachmark for the operation description. In particular, the in-app instruction system 102 identifies a coachmark that has a highest probability of matching the operation description based on the probability distribution or which was selected based on the joint inference performed in act 1508.

Additionally, as shown in FIG. 15, the in-app instruction system 102 performs an act 1512 to determine a probability distribution of words matching the operation description. In particular, the in-app instruction system 102 utilizes the multi-task summarization neural network (described in detail above) to determine a probability that one or more word (e.g., words selected from the operation description or selected from a vocabulary) corresponds to the operation description. Thus, based on the probability distribution, the in-app instruction system 102 determines a strength of a relationship or correspondence between the word and the operation description.

The in-app instruction system 102 can utilize the probability distribution as a distribution of selection probabilities indicating a likelihood that the in-app instruction system 102 will select the word to use within the concise instruction. Indeed, the in-app instruction system 102 performs an act 1514 to select one or more words to use in a concise instruction based on the probability distribution. For example, at a given time step of the multi-task summarization neural network, the in-app instruction system 102 selects a word with a highest probability to use within the concise instruction at the position within the concise instruction corresponding to the current time step.

Additionally, the in-app instruction system 102 performs an act 1516 to determine whether or not to add another word to the concise instruction. For example, the in-app instruction system 102 determines a size of the concise instruction (e.g., based on a number of time steps or iterations to apply the multi-task summarization neural network) and determines whether or not there are more words to add to the concise instruction to fill its size (e.g., to reach a threshold number of time steps). Upon determining that there are more words to include within the concise instruction, the in-app instruction system 102 repeats the acts 1512-1516 until the in-app instruction system 102 generates the complete concise instruction with words for each of the time steps.

Upon determining that there are no more words to add to the concise instruction, the in-app instruction system 102 performs an act 1518 to provide the completed concise instruction. For example, the in-app instruction system 102 provides the concise instruction for display within a user interface on a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
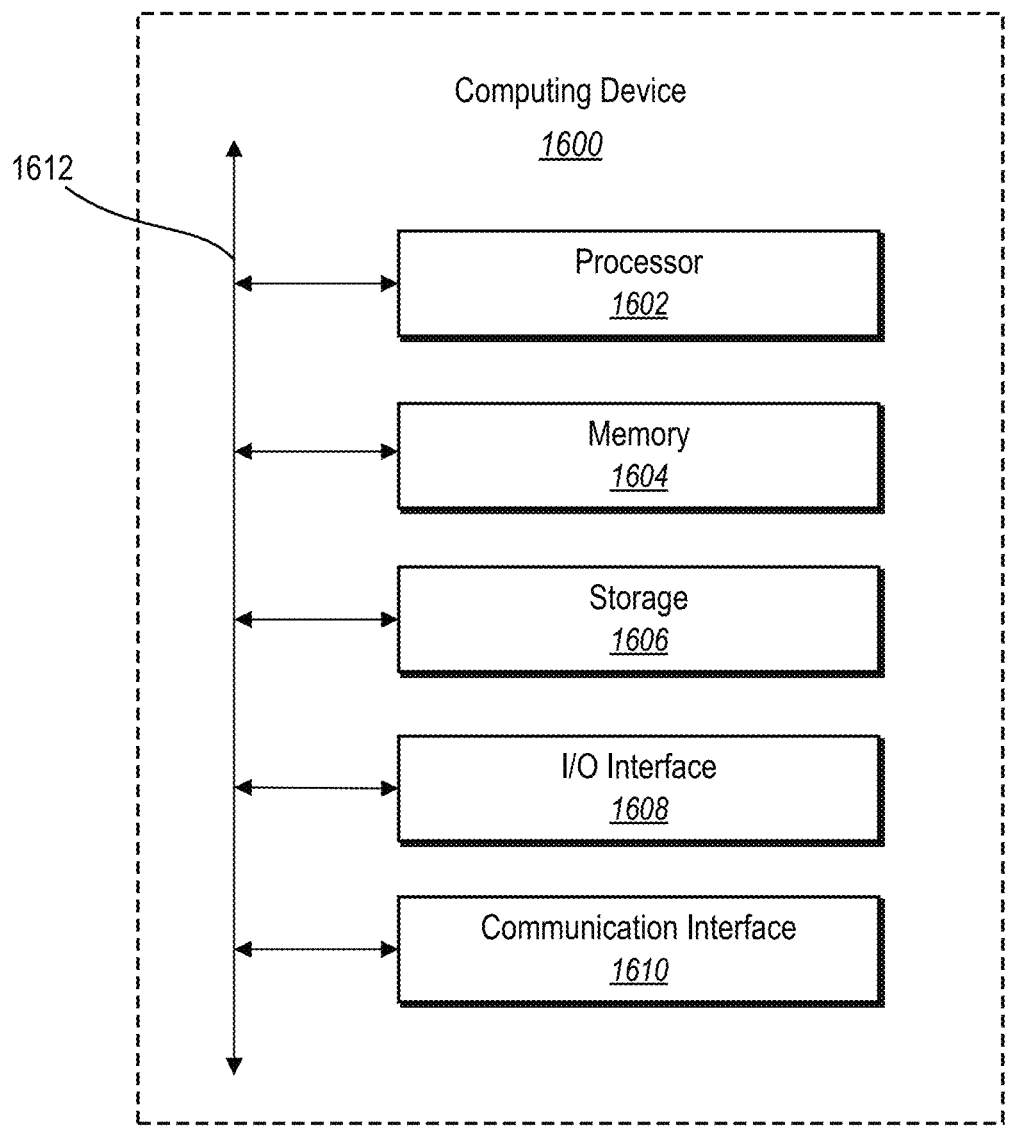
FIG. 16 illustrates a block diagram of an example computing device in accordance with one or more embodiments.

FIG. 16 illustrates, in block diagram form, an example computing device 1600 (e.g., the computing device 1300, the client device 108, and/or the server(s) 104) that may be configured to perform one or more of the processes described above. One will appreciate that the in-app instruction system 102 can comprise implementations of the computing device 1600. As shown by FIG. 16, the computing device can comprise a processor 1602, memory 1604, a storage device 1606, an I/O interface 1608, and a communication interface 1610. Furthermore, the computing device 1600 can include an input device such as a touchscreen, mouse, keyboard, etc. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive (HDD), flash memory, a Universal Serial Bus (USB) drive or a combination of these or other storage devices.

The computing device 1600 also includes one or more input or output ("I/O") devices/interfaces 1608, which are provided to allow a user to provide input to (such as user strokes), receive output from, and otherwise transfer data to and from the computing device 1600. These I/O devices/interfaces 1608 may include a mouse, keypad or a keyboard, a touch screen, camera, optical scanner, network interface, modem, other known I/O devices or a combination of such I/O devices/interfaces 1608. The touch screen may be activated with a writing device or a finger.

The I/O devices/interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can comprise hardware, software, or both that couples components of computing device 1600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    identify, from a repository of descriptions for guiding a user through operations associated with a client application, a description of an operation to perform within the client application;
    generate, from encodings extracted from the description of the operation utilizing multi-task summarization neural network comprising a first set of layers for a concise instruction generator and a second set of layers for a coachmark generator:
        a concise instruction by utilizing the first set of layers for the concise instruction generator of the multi-task summarization neural network to:
            generate, a sequence of vector representations corresponding to words from the description of the operation; and
            determine, based on the sequence of vector representations, copy probabilities and generation probabilities for successive time steps associated with the multi-task summarization neural network;
        a coachmark by utilizing the second set of layers for the coachmark generator of the multi-task summarization neural network to:
            determine, for a plurality of coachmark identifiers, respective probabilities of corresponding to the description of the operation; and
            identify, from the plurality of coachmark identifiers; and
    provide, for display within a user interface of the client application, representations of the concise instruction and the coachmark.

2. The non-transitory computer readable medium of claim 1, further comprising instructions that, when executed by the at least one processor, cause the computing device to generate the coachmark by utilizing the second set of layers for the coachmark generator of the multi-task summarization neural network generate the coachmark by identifying a user interface element selectable for performing the operation within the client application.

3. The non-transitory computer readable medium of claim 1, further comprising instructions that, when executed by the at least one processor, cause the computing device to generate the concise instruction by utilizing the first set of layers for the concise instruction generator of the multi-task summarization neural network to:
    determine the copy probabilities by determining likelihoods of selecting words from the description of the operation to utilize within the concise instruction; and
    determine the generation probabilities by determining likelihoods of selecting new words from a vocabulary to utilize within the concise instruction.

4. The non-transitory computer readable medium of claim 1, further comprising instructions that, when executed by the at least one processor, cause the computing device to select words for the concise instruction based on the copy probabilities and the generation probabilities.

5. The non-transitory computer readable medium of claim 1, further comprising instructions that, when executed by the at least one processor, cause the computing device to jointly generate the coachmark and the concise instruction utilizing the first set of layers and the second set of layers of the multi-task summarization neural network.

6. The non-transitory computer readable medium of claim 1, further comprising instructions that, when executed by the at least one processor, cause the computing device to jointly generate multiple coachmarks for multiple operations based on determining relationships between the multiple coachmarks utilizing the first set of layers and the second set of layers of the multi-task summarization neural network.

7. The non-transitory computer readable medium of claim 1, wherein the multi-task summarization neural network comprises an encoder, a decoder, the second set of layers for the coachmark generator, and the first set of layers for the concise instruction generator.

8. The non-transitory computer readable medium of claim 7, further comprising instructions that, when executed by the at least one processor, cause the computing device to generate the concise instruction by conditioning the decoder based on the coachmark.

9. A system comprising:
one or more memory devices comprising a repository of descriptions for guiding a user through operations associated with a client application, a plurality of coachmarks corresponding to respective user interface elements associated with the client application, and a multi-task summarization neural network comprising an encoder, a decoder, a first set of layers for a coachmark generator, and a second set of layers for a concise instruction generator; and
one or more computing devices that are configured to cause the system to:
identify, from the repository of descriptions, a description of an operation to perform within the client application;
determine, from the plurality of coachmarks, a coachmark that indicates a user interface element associated with the description of the operation by:
utilizing the encoder to generate encoder vector representations of the description; and
utilizing the first set of layers for the coachmark generator of the multi-task summarization neural network to determine, for the encoder vector representations, respective probabilities of corresponding to the description of the operation;
generate a concise instruction corresponding to the coachmark by:
utilizing the decoder to generate decoder vector representations based on the encoder vector representations; and
utilizing the second set of layers for the concise instruction generator of the multi-task summarization neural network to determine, based on the decoder vector representations, copy probabilities and generation probabilities for successive time steps associated with the multi-task summarization neural network; and
provide, for display within a user interface associated with the client application, representations of the concise instruction and the coachmark.

10. The system of claim 9, wherein the one or more computing devices are further configured to cause the system to generate the concise instruction to include one or more words that correspond to the coachmark.

11. The system of claim 9, wherein the one or more computing devices are configured to cause the system to generate the concise instruction to include a first word from the description of the operation and a second generated word from a vocabulary associated with the multi-task summarization neural network.

12. The system of claim 9, wherein the one or more computing devices are configured to cause the system to utilize the concise instruction generator to generate the respective probabilities of corresponding to the description of the operation based further on the coachmark.

13. The system of claim 9, wherein the one or more computing devices are configured to cause the system to determine the coachmark by determining that the coachmark has a highest probability from among the plurality of coachmarks.

14. The system of claim 9, wherein the one or more computing devices are configured to further cause the system to utilize the multi-task summarization neural network to generate a second coachmark for a second operation independent from the coachmark associated with the operation.

15. The system of claim 9, wherein the one or more computing devices are configured to further cause the system to utilize the multi-task summarization neural network to jointly generate an additional coachmark for an additional operation based on determining a relationship between the coachmark and the additional coachmark.

16. A computer-implemented method for providing in-app instructions for guiding users through tasks associated with client applications, the computer-implemented method comprising:
identifying, from a repository of descriptions for guiding a user through operations associated with a client application, a description of an operation to perform within the client application;
generating, from encodings extracted from the description of the operation utilizing a multi-task summarization neural network comprising a first set of layers for a concise instruction generator and a second set of layers for a coachmark generator:
a concise instruction by utilizing the first set of layers for the concise instruction generator of the multi-task summarization neural network to:
generate a sequence of vector representations corresponding to words from the description of the operation; and
determine, based on the sequence of vector representations, copy probabilities and generation probabilities for successive time steps associated with the multi-task summarization neural network; and
a coachmark by utilizing the second set of layers for the coachmark generator of the multi-task summarization neural network to:
determine, for a plurality of coachmark identifiers, respective probabilities of corresponding to the description of the operation; and
identify, from the plurality of coachmark identifiers, a coachmark identifier with a highest probability; and
providing, for display within a user interface associated with the client application, representations of the concise instruction and the coachmark.

17. The computer-implemented method of claim 16, wherein the concise instruction comprises a summarized version of the description of the operation.

18. The computer-implemented method of claim 16, wherein the coachmark comprises a visual indicator for display to indicate a particular user interface element that a user is to interact with as part of performing the operation.

19. The computer-implemented method of claim 16, wherein providing the representations of the concise instruction and the coachmark comprises:
providing the coachmark for display in a position to outline a user interface element within the user interface; and
providing the concise instruction for display in a position within the user interface based on the position of the coachmark.

20. The computer-implemented method of claim 16, further comprising:
- receiving a request to access a tutorial for performing the operation from a client device running the client application; and
- providing the representations of the concise instruction and the coachmark to the client device in response to the request.

* * * * *